US012670802B2

(12) United States Patent
Hasunuma

(10) Patent No.: US 12,670,802 B2
(45) Date of Patent: Jun. 30, 2026

(54) INFORMATION PROCESSING DEVICE, INFORMATION PROCESSING METHOD, AND RECORDING MEDIUM

(71) Applicant: CASIO COMPUTER CO., LTD., Tokyo (JP)

(72) Inventor: Takuya Hasunuma, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/588,714

(22) Filed: Feb. 27, 2024

(65) Prior Publication Data

US 2024/0290214 A1 Aug. 29, 2024

(30) Foreign Application Priority Data

Feb. 28, 2023 (JP) ................................. 2023-029904

(51) Int. Cl.
*G09B 7/04* (2006.01)
*G06T 11/60* (2026.01)
(52) U.S. Cl.
CPC ................ *G09B 7/04* (2013.01); *G06T 11/60* (2013.01)
(58) Field of Classification Search
CPC .............. G09B 7/04; G09B 5/12; G06T 11/60
See application file for complete search history.

(56) References Cited

U.S. PATENT DOCUMENTS 10,096,261 B1 * 10/2018 Kasula ............... G09B 19/0053
10,176,611 B2 * 1/2019 Felt ......................... G06T 11/60

| | | | |
|---|---|---|---|
| 11,720,604 B2 * | 8/2023 | Bhagavatha .......... | G06F 40/216 |
| | | | 707/740 |
| 2004/0184057 A1 * | 9/2004 | Nakabayshi .............. | G06T 1/60 |
| | | | 358/1.9 |
| 2004/0229194 A1 * | 11/2004 | Yang ........................ | G09B 7/02 |
| | | | 434/118 |
| 2007/0200873 A1 * | 8/2007 | Hsu .......................... | G06T 11/60 |
| | | | 345/629 |
| 2007/0238084 A1 * | 10/2007 | Maguire ................ | G09B 19/06 |
| | | | 434/353 |
| 2007/0297018 A1 * | 12/2007 | Bangham ................ | G06T 11/60 |
| | | | 358/452 |
| 2012/0231441 A1 | 9/2012 | Parthasarathy et al. | |
| 2016/0119388 A1 * | 4/2016 | Sitrick .................. | G06F 3/0484 |
| | | | 715/753 |

(Continued)

FOREIGN PATENT DOCUMENTS

JP 2012198363 A 10/2012
JP 2014016669 A 1/2014

(Continued)

OTHER PUBLICATIONS

Extended European search report dated Jun. 25, 2024 received in European Patent Application No. 24154206.7.

*Primary Examiner* — Eddy Saint-Vil
(74) *Attorney, Agent, or Firm* — Scully, Scott, Murphy & Presser, P.C.

(57) ABSTRACT

An information processing device that manages target data able to be shared and edited by a plurality of users, includes a controller that selects an editing mode according to which of a plurality of editing stages the target data is in, when the target data is edited step by step by the plurality of users, and that decides editing conditions of the target data according to the selected editing mode.

16 Claims, 16 Drawing Sheets

(56)                    References Cited

U.S. PATENT DOCUMENTS

2020/0074878 A1*   3/2020   Hertsgaard  ............ G09B 19/00
2020/0210693 A1*   7/2020   Scanlan  .................. G09B 7/04
2020/0273364 A1*   8/2020   Donaldson  .............. G09B 7/04
2021/0027248 A1*   1/2021   Dawley  ................. G09B 19/00

FOREIGN PATENT DOCUMENTS

JP           2019192120  A      10/2019
JP           2022142719  A       9/2022

* cited by examiner

FIG. 18

| | In creating sticky note | In correcting sticky note | Corrected sticky note is acquired from "submit" and edited in notebook | In re-correcting resubmitted sticky note | Corrected sticky note is acquired from "keep" and edited in notebook | Corrected sticky note is acquired from "send/receive" and edited in notebook | Corrected sticky note is acquired from "share" and edited in notebook |
|---|---|---|---|---|---|---|---|
| Teacher 1: Person who corrects sticky note | -- | Ld,Le,Lc | La,Lb,Lc | Ld,Le,Lc | La,Lb,Lc | La,Lb,Lc | La,Lb,Lc |
| Teacher 2: Second person who corrects sticky note | -- | -- | La,Lb,Lc | Ld,Le,Lc | La,Lb,Lc | La,Lb,Lc | La,Lb,Lc |
| Student 1: Person who created sticky note | La,Lb,Lc | -- | La,Lb,Lc | -- | La,Lb,Lc | La,Lb,Lc | La,Lb,Lc |
| Student 2: Person who got sticky note | -- | -- | La,Lb,Lc | -- | La,Lb,Lc | La,Lb,Lc | La,Lb,Lc |

INFORMATION PROCESSING DEVICE, INFORMATION PROCESSING METHOD, AND RECORDING MEDIUM

BACKGROUND

1. Field

This disclosure relates to an information processing device, an information processing method, and a recording medium.

2. Related Art

Conventionally, learning support systems have been used to share various information such as answers to issues and correction results thereof between teachers and students using computer network systems.

For example, there has been proposed a system in which a participant generates a handwriting image showing the participant's handwriting written with an electronic pen in a participant unit, and in which an instructor inputs correction information while the handwriting image is displayed in an instructor unit. In this system, the correction information input by the instructor is displayed in a different area from the handwriting image generated by the participant's handwriting (For example, Japanese Unexamined Patent Application Publication No. 2012-198363).

Since it is difficult to recognize the correction target position in the above display method, there may be considered a method in which a teacher (instructor) writes the correction contents in the same area as the student's (learner's) answers. This enables the teacher to specify correction target positions on the answers and to add comments and marks.

SUMMARY

An information processing device according to this disclosure is an information processing device that manages target data able to be shared and edited by a plurality of users, the device including a controller that selects an editing mode according to which of a plurality of editing stages the target data is in when the target data is edited step by step by the plurality of users and that decides editing conditions of the target data according to the selected editing mode.

BRIEF DESCRIPTION OF THE DRAWINGS

FIG. 18 is a diagram illustrating an example of layers to write on at each situation for each user's editing of a sticky note.

DETAILED DESCRIPTION

Hereinafter, embodiments of an information processing system according to this disclosure are described in detail with reference to the drawings. The embodiments described below are subject to various technically preferable limitations to implement the present disclosure, but the technical scope of the present disclosure is not limited to the following embodiments and illustrated examples.

In this embodiment, the information processing system is assumed to be used by teachers and students in a school. Note that schools are not limited to regular elementary schools, junior high schools, high schools, and universities, but also include vocational schools, tutoring schools, university preparatory schools, and so on.

Figure 1:
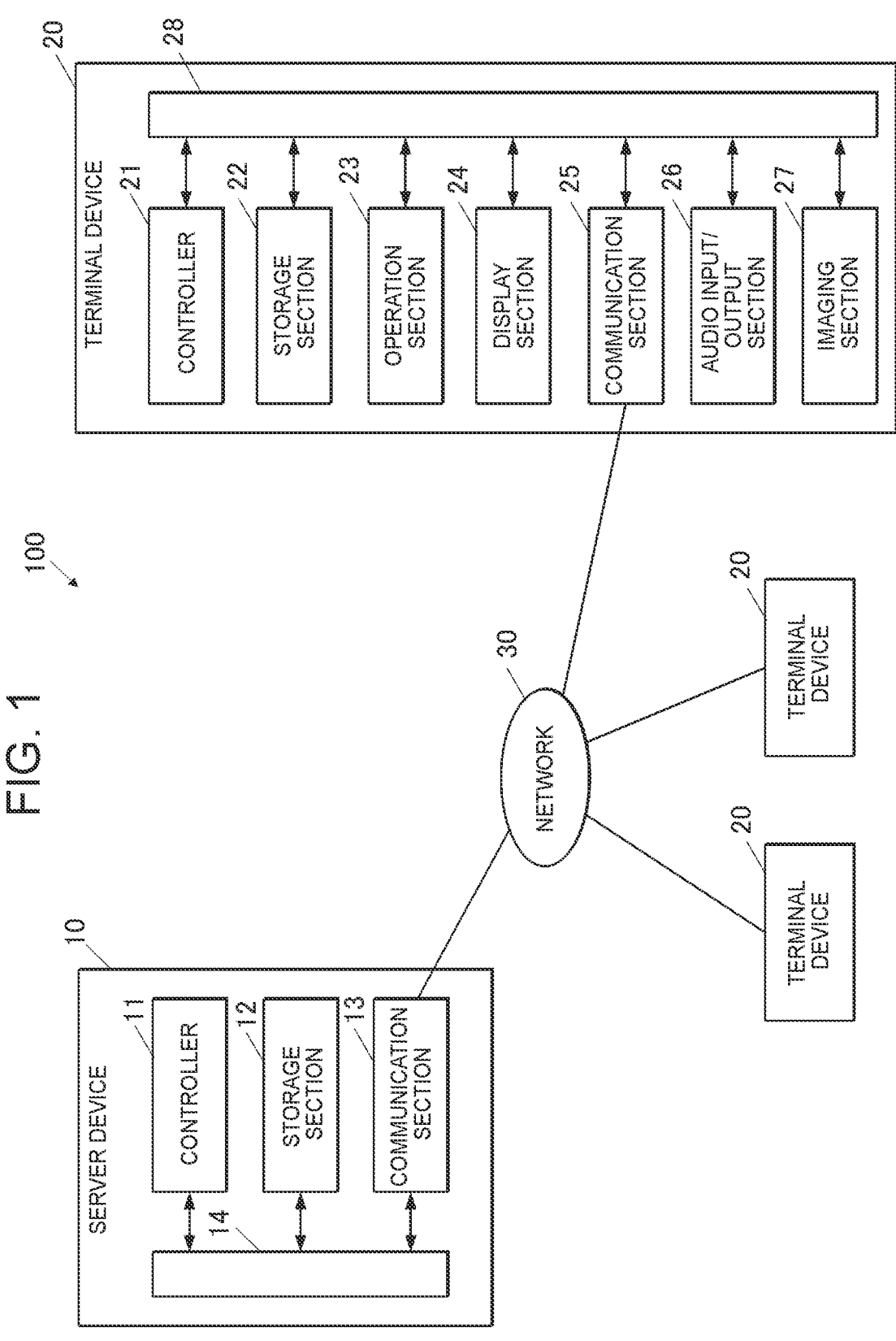
FIG. 1 is a diagram illustrating an example configuration of an information processing system according to an embodiment of the present disclosure.

FIG. 1 illustrates an example configuration of an information processing system 100 according to this embodiment.

The information processing system 100 includes a server device 10, which is an information processing device, and a plurality of terminal devices 20. The server device 10 and respective terminal devices 20 are connected to each other via a network 30 in a data-communicatable manner.

The terminal device 20 is used by each user (teacher, student). The terminal device 20 may be any of a personal computer, a portable terminal device such as a tablet, or a mobile communication device such as a smart phone. The number of terminal devices 20 is not particularly limited.

The network 30 may be any telecommunications network such as, for example, the Internet, a wireless LAN (local area network), a wired LAN, a mobile communication network, a short-distance wireless communication network, or a combination of some or all of the above.

The server device 10 includes a controller 11, a storage section 12, a communication section 13, and so on. These components are connected to each other via a system bus 14.

The controller 11 includes a central processing unit (CPU), a random access memory (RAM), and so on to control each part of the server device 10. Specifically, the controller 11 reads a specified recording medium among the system programs and application programs stored in the storage section 12, expands the specified recording medium to the RAM, and performs various processes according to the specified recording medium.

For example, the controller 11 generates a control signal to cause the display section 24 of the terminal device 20 to perform the display related to the result of the application program execution according to the result of the application program execution, and sends the control signal to the terminal device 20 via the communication section 13.

The storage section 12 is composed of, for example, a hard disk drive (HDD), a solid state drive (SSD), an electrically erasable programmable read only memory (EE-PROM), and the like.

The storage section 12 stores data necessary for execution of the recording media, such as the system programs and application programs executed by the controller 11.

Figure 2:
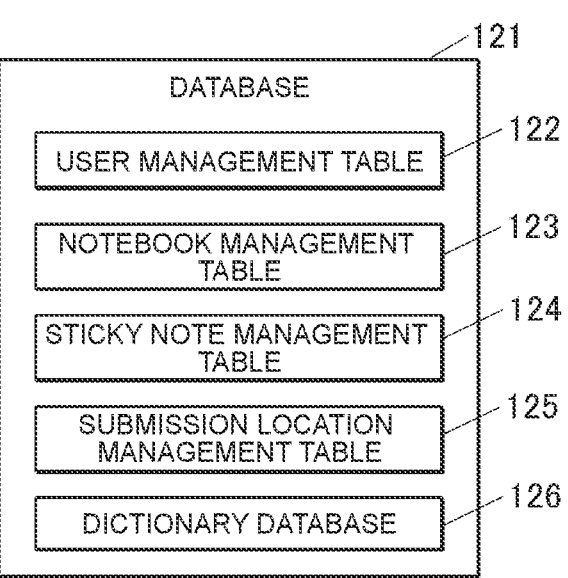
FIG. 2 is an example configuration of a database provided in a storage of a storage section of a server device.

FIG. 2 illustrates an example configuration of a database 121 provided in the storage of the storage section 12.

The database 121 includes a user management table 122, a notebook management table 123, a sticky note management table 124, a submission location management table 125, a dictionary database 126, and so on.

The user management table 122 manages information related to a user (for example, a teacher, a student, or the like) who uses a learning support application (hereinafter, referred to as "learning support app"), which is an information processing service provided by the information processing system 100. The user management table 122 stores information such as a user ID, a password, a user name, a school ID, an e-mail address, a user type, a class affiliation, an age, a gender, and a location, which are associated with each other, for each user. The data indicating information kept in the user management table 122 is also referred to as user management data. When a new user is registered, a new row of user management data is added to the user management table 122.

The user ID is a unique identification information assigned to each user. The password is registered by a user. The user name is a registered user's name. The school ID is identification information of a school to which the user belongs. The e-mail address is used by the registered user. The user type, the class affiliation, the age, the gender, and the location are attribute information for each user. The user type in the above is information such as a student, a teacher, or the like. The class affiliation is set on the class to which the user belongs (for example, class 1 of the 1st grade or the like), which is set when the user type is a student. The location is the user's address, residence, or the like.

The notebook management table 123 is used to manage information on notebooks created by a user in the learning support application. In the notebook management table 123, information such as a notebook ID, a user ID, and a lesson ID are stored in association with each other for each notebook created by the user. The data that indicates information kept in the notebook management table 123 is also referred to as the notebook management data. When a new notebook is created, a new row of notebook management data is added to the notebook management table 123.

The notebook ID is identification information assigned to each notebook. The user ID is identification information of the user who created the notebook. The lesson ID is identification information of a lesson to which the notebook belongs.

The sticky note management table 124 manages information on electronic sticky notes (hereinafter, also simply referred to as "sticky notes") created by a user in a learning support application. The sticky note management table 124 stores information such as a sticky note ID, a notebook ID, a sticky note type, and a sticky note content associated with each other for each user-created sticky note. Data that indicates information kept in the sticky management table 124 is also referred to as sticky note management data. When a new sticky note is created, a new row of sticky note management data is added to the sticky note management table 124.

The sticky note ID is unique identification information assigned to each sticky note. The notebook ID is identification information of the notebook in which each sticky note is displayed, and corresponds to the notebook ID contained in the notebook management data kept in the notebook management table 123. The sticky note type is information indicating the type of the sticky note, such as a text sticky note, a camera sticky note, a link sticky note, a file sticky note, a dictionary sticky note, or the like. The sticky note content is information indicating the content of a sticky note, such as a character string, an image, or a video. The sticky note content may also include information about display settings of each sticky note in the notebook, such as a display position, a display size, or a display color.

The submission location management table 125 is used to manage information about submission locations of answers (sticky notes) to issues created by users in a learning support app. In the submission location management table 125, information such as a submission location ID, a submission destination name, a deadline, an issue creator user ID, an issue sticky note ID, a distribution destination user ID, and so on are stored in association with each other for each submission location. Data that indicates information kept in the submission location management table 125 is also referred to as submission location management data. When a new submission location is created, a new row of submission location management data is added to the submission location management table 125.

The submission location ID is a unique identification information assigned to each submission location management data. The submission destination name is the name of a submission destination (submission location). The deadline is the deadline for submitting an answer to an issue. The issue creator user ID is identification information of a user (teacher) who created a submission location and an issue (sticky note). The issue sticky note ID is identification information of a sticky note created as an issue. The distribution destination user ID is identification information of a user specified as a distribution destination of the issue (a student who is to create an answer to the issue). A plurality of distribution destination user IDs may be specified.

Moreover, the submission location management table 125 contains records of information indicating whether the user (student) has already acquired (downloaded) the issue, information indicating whether the user (student) has already submitted the answer, and the sticky note ID indicating the sticky note of the answer created by the user.

The dictionary database 126 stores dictionary data for Japanese-language dictionaries, English-Japanese dictionaries, German-Japanese dictionaries, French-Japanese dictionaries, and so on, in which each headword (word) is associated with its explanatory text including its part of speech, meaning, etymology, and examples of use.

The communication section 13 includes a network interface card (NIC) and so on to access the network 30 to perform telecommunications with external devices.

The controller 11 generates an area (notebook) in which a user inputs and display arbitrary information in response to an operation of an operation section 23 of the terminal device 20, and displays the notebook on the display section 24 of the terminal device 20.

The controller 11 generates an electronic sticky note in response to an operation from the operation section 23 of the terminal device 20 on the notebook, and displays the electronic sticky note on the notebook.

An electronic sticky note is a display object that contains information that a user wants to write down. The electronic sticky note is displayed at an arbitrary position in the display area (notebook), and is able to be created, in addition to adding a content to the content of the electronic sticky note, modifying or deleting the content, moving to another display position, or the like, according to a user's operation. The shape, size, color, or the like of the electronic sticky note may also be changed.

The controller 11 manages sticky notes as target data able to be shared and edited by a plurality of users. In this embodiment, the target data is data shared by the plurality of users as electronic sticky notes.

The controller 11 selects an editing mode according to an approach method used when the sticky note is to be edited by each of the plurality of users through an operation of the terminal device 20 corresponding to the user, and then, according to the selected editing mode, the controller 11 decides the editing conditions of the sticky note for the user. The approach method means the procedure for moving to the screen for editing the sticky note, the contents of the operation, and the like.

In this embodiment, the editing mode for correcting the sticky note is referred to as "correction mode," and the editing mode for editing the sticky note other than correcting the sticky note is referred to as "creation mode."

The approach method includes a plurality of approach methods in which the procedure or the operation content used when moving to the editing screen for editing the sticky note (target data) differs according to a user attribute and an editing type.

The controller 11 selects an editing mode that differs according to the difference in the approach method.

When the plurality of users edits a sticky note (target data) step by step, the controller 11 selects an editing mode according to which of a plurality of editing stages the sticky note (target data) is in, and decides the editing conditions of the sticky note according to the selected editing mode.

The plurality of editing stages includes at least a plurality of stages of a creation stage, a correction stage, a modification stage, and a re-correction stage.

The creation stage is a stage in which a first user creates a sticky note (target data).

The correction stage is a stage after the creation stage, in which the sticky note is corrected by a second user who is different from the first user.

The modification stage is a stage after the correction stage, in which the first user modifies the sticky note.

The re-correction stage is a stage after the modification stage, in which the second user re-corrects the sticky note.

The sticky note (target data) is, for example, data in which a student's answer to an issue submitted by a teacher is input.

In this case, the plurality of editing stages includes: a creation stage of a sticky note as a student's answer to an issue; an editing stage of the sticky note as teacher's correction to the student's answer; and an editing stage of the sticky note as student's modification to the correction.

In this specification, the sticky note (target data) is managed in a plurality of layers, each with different edited content.

For each of the plurality of users, the controller 11 decides the editing conditions of the sticky note by deciding which of the plurality of layers is allowed to be edited according to the selected editing mode.

For example, the plurality of layers that constitutes the sticky note includes a first layer and a second layer.

The first layer is a creation layer used to create or modify the sticky note.

The second layer is a correction layer used to correct the sticky note. The second layer is a layer that is added when the sticky note is corrected, and is not present before the correction.

When an instruction is made to correct a sticky note by an operation from the terminal device 20, the controller 11 decides the second layer as a layer to write on by editing the sticky note. For example, a case in which a user who is a teacher corrects a sticky note (target data) created by a user who is a student is assumed.

When an instruction is made to edit (normally edit) a sticky note other than to correct the sticky note through an operation of the terminal device 20, the controller 11 decides the first layer as a layer to write on by editing the sticky note. For example, a case in which a user who is a student creates or modifies a sticky note (target data) is assumed.

The controller 11 displays the first layer and the second layer overlaid each other on the display section 24 of the terminal device 20, and switches between the display and the non-display of the second layer (correction content) through a user operation from the terminal device 20.

The plurality of layers constituting a sticky note includes an image layer and an object layer.

The image layer is a layer in which a plurality of input data is managed as a single piece of image data and new input data in an imaged state is overlaid on the single piece of image data so that the new input data is stored in a form where the new input data cannot be individually deleted. The image layer is, for example, a layer where handwritten data is input.

The object layer is a layer in which the plurality of input data is managed as individual object data and the new input data is stored in a form in which the new input data is able to be individually deleted. The object layer is, for example, a layer to which stamp data or text data is input.

The controller 11 decides whether to allow editing of at least the image layer, depending on the selected editing mode.

The controller 11 may also decide whether to allow editing for both the image layer and the object layer, depending on the selected editing mode.

The image layer includes a first image layer and a second image layer with different editing conditions according to the selected editing mode.

The object layer includes a first object layer and a second object layer with different editing conditions according to the selected editing mode.

Some of the plurality of layers that constitute a sticky note are not present before an editing operation in a specific editing mode is performed, and are generated in response to the editing operation in the specific editing mode. The editing operation in the specific editing mode is, for example, a correction.

[Configuration of terminal device 20] The terminal device 20 includes a controller 21, a storage section 22, an operation section 23, a display section 24, a communication section 25, an audio input/output section 26, an imaging section 27, and so on. These components are connected to each other via a system bus 28.

The controller 21 has a CPU, a RAM, and the like, and controls each section of the terminal device 20. Specifically, the controller 21 reads a specified recording medium among the system programs and the application programs stored in the storage section 22, expands the specified recording medium to the RAM, and performs various processes according to the specified recording medium.

For example, the controller 21 executes the learning support app program to send information based on the content of the user's input operation to the operation section 23 to the server device 10 by the communication section 25 or to cause the display section 24 to display information received from the server device 10.

The storage section 22 includes, for example, an HDD, an SSD, an EEPROM, and so on.

The storage section 22 stores data necessary for execution of the recording media, such as the system programs and learning support app program executed by the controller 21. The recording medium concerned may be downloaded to the storage section 22 from an external web server via the network 30 and the communication section 25.

The operation section 23 has, for example, an operation input section such as a keyboard, a touch panel, a mouse, and the like. The operation section 23 accepts a user's operation input and outputs the operation information to the controller 21.

The display section 24 includes a liquid crystal display (LCD), an electro luminescence (EL) display, and the like, and performs various displays according to display information specified by the controller 21.

The communication section 25 includes at least one of a wired communication module such as an NIC and a wireless communication module, and accesses the network 30 to perform telecommunications with external devices.

The audio input/output section 26 has an audio input section such as a microphone and an audio output section such as an amplifier, a loudspeaker, or the like. The audio input/output section 26 acquires audio signals such as user's voice by the audio input section, converts the audio signals to audio data, and outputs the audio data to the controller 21. The audio input/output section 26 also performs audio output on the basis of the audio data input from the controller 21 by the audio output section.

The imaging section 27 is a digital camera section that has an optical system and image sensors such as a charge coupled device (CCD), a complementary metal oxide semiconductor (CMOS), and the like. The imaging section 27 captures a subject, generates image data of a still image or a video, and outputs the image data to the controller 21.

Subsequently, the operation of the information processing system 100 is described.

Teachers and students are able to share various information, such as correction issues in a lesson, using the lesson support function during or outside of school hours.

First, a description is given below about the procedure until each user moves to the notebook screen when using the lesson support function.

On the terminal device 20 used by the user, the controller 21 executes the learning support app and accepts the input of a school ID, a user ID, and a password through a user's operation from the operation section 23.

The controller 11 of the server device 10 refers to the user management table 122 and allows user login of the terminal device 20 in the case where there is data that matches the combination of the information input from the terminal device 20.

The controller 11 of the server device 10 displays the lesson screen 40 on the display section 24 of the terminal device 20.

Figure 3:
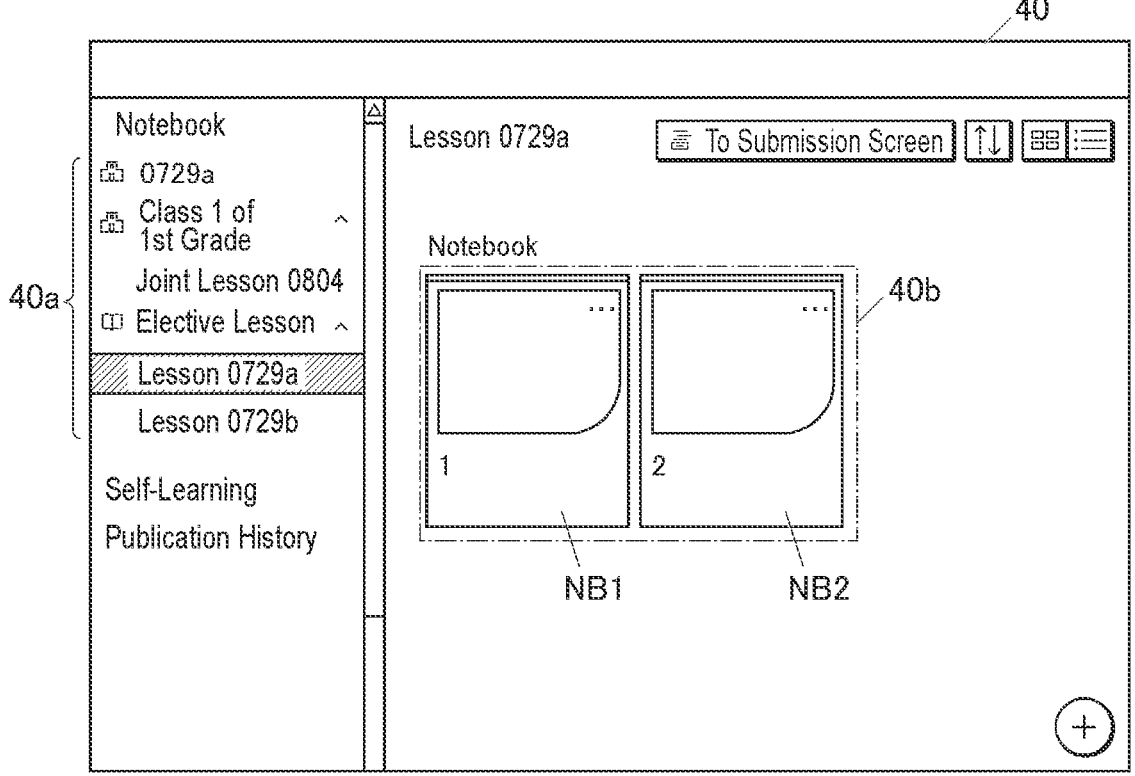
FIG. 3 is an example of a lesson screen.

FIG. 3 illustrates an example of the lesson screen 40 displayed on the display section 24 of the terminal device 20.

The controller 11 of the server device 10 refers to the notebook management table 123, identifies a lesson related to the user on the basis of the lesson ID contained in the notebook management data corresponding to the user ID of the logged-in user, and displays the lesson list 40*a* in the lesson screen 40.

The user selects one of the lessons from the lesson list 40*a* in the lesson screen 40 through an operation of the operation section 23 of the terminal device 20. In the example illustrated in FIG. 3, "lesson 0729a" is selected.

The controller 11 of the server device 10 refers to the notebook management table 123 and displays the notebook icon corresponding to the notebook created for the selected lesson in the notebook display area 40*b* in the lesson screen 40. In the example illustrated in FIG. 3, notebook icons NB1 and NB2 are displayed as notebooks created for "lesson 0729a."

The user selects one of the notebooks (notebook icons) in the notebook display area 40*b* in the lesson screen 40 through an operation of the operation section 23 of the terminal device 20.

Although the notebook is selected from among the notebooks already created, a new notebook may be created. When a new notebook is created through an operation of the terminal device 20, the controller 11 of the server device 10 adds a new row of notebook management data to the notebook management table 123.

The controller 11 of the server device 10 displays the notebook screen 41 corresponding to the selected or newly-created notebook on the display section 24 of the terminal device 20.

Figure 4A:
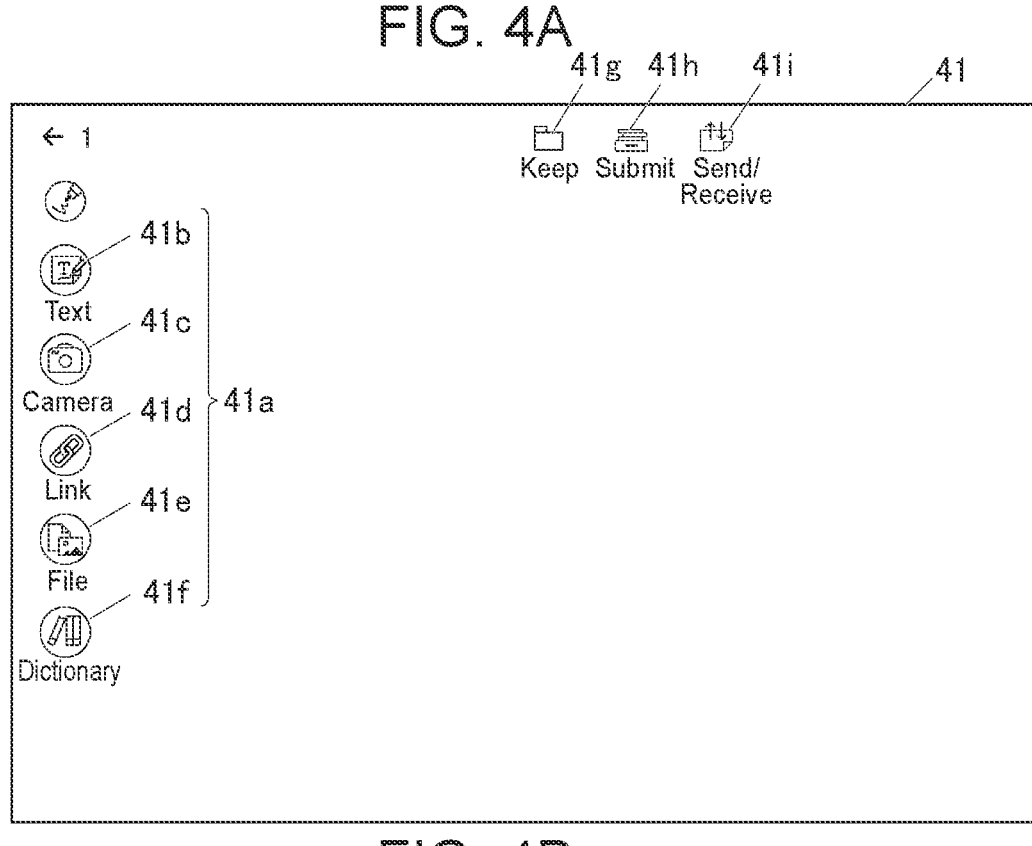
FIG. 4A is an example of a notebook screen.

FIG. 4A illustrates an example of the notebook screen 41 displayed on the display section 24 of the terminal device 20.

Figure 4B:
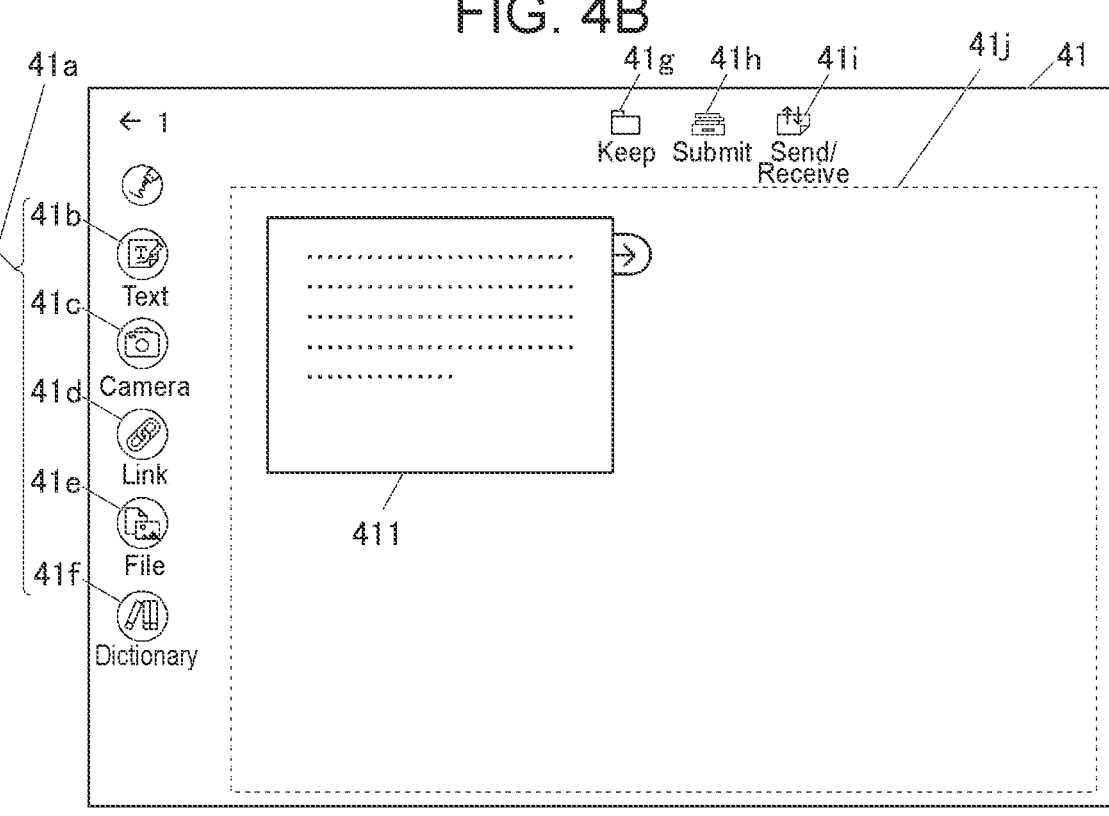
FIG. 4B is an example of a notebook screen with sticky notes displayed in a sticky note display area.

The controller 11 of the server device 10 refers to the sticky note management table 124. In the case where the sticky note management data containing the notebook ID corresponding to the selected notebook is present, the controller 11 displays a sticky note 411 in the sticky note display area 41*j* within the notebook screen 41, as illustrated in FIG. 4B.

In the notebook screen 41, there is provided a notebook menu 41*a*. The notebook menu 41*a* includes, for example, a text sticky note button 41*b*, a camera sticky note button 41*c*, a link sticky note button 41*d*, a file sticky note button 41*e*, and a dictionary sticky note button 41*f*. Each button contained in the notebook menu 41*a* is pressed when a user wants to paste and create an electronic sticky note into a notebook.

Figure 5A:
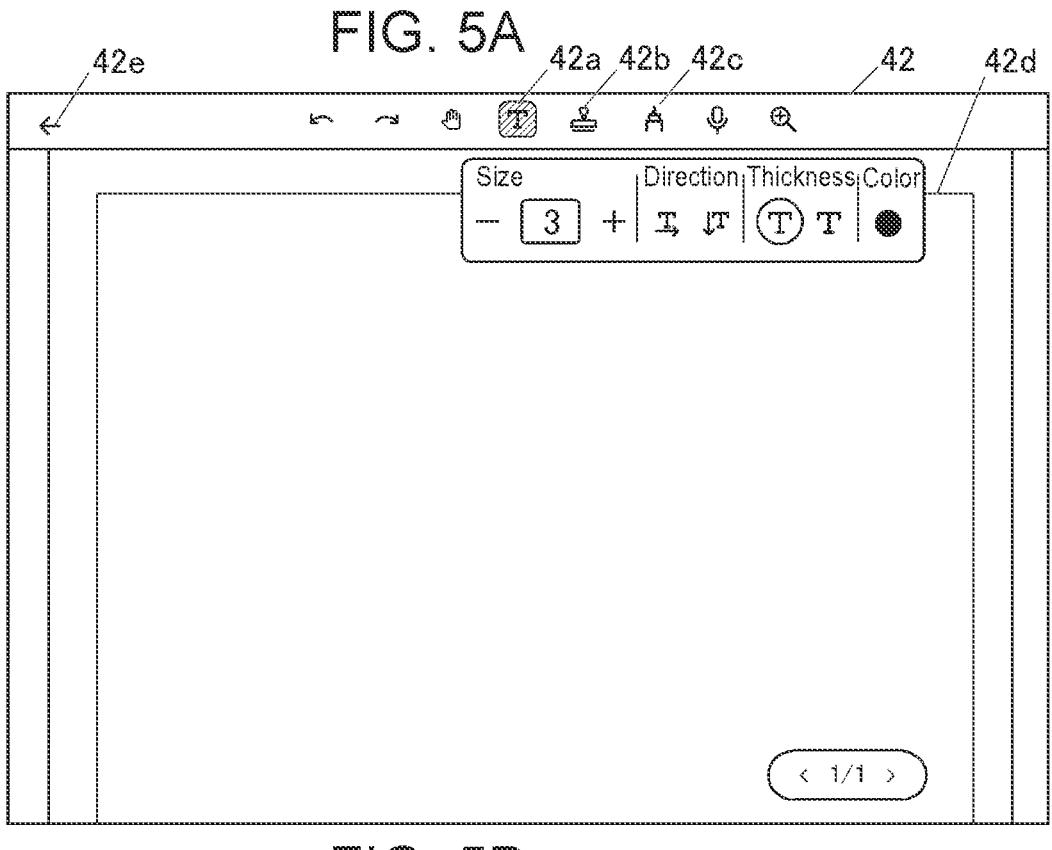
FIG. 5A is an example of a sticky note editing screen.

When the text sticky note button 41*b* is pressed by the user who operates the operation section 23 of the terminal device 20 in the notebook screen 41, the controller 11 of the server device 10 displays the sticky note editing screen 42 illustrated in FIG. 5A on the display section 24 of the terminal device 20 to accept editing.

When the camera sticky note button 41*c* is pressed on the notebook screen 41, the controller 11 of the server device 10 activates the imaging section 27 of the terminal device 20 and causes the display section 24 of the terminal device 20 to display an arbitrary image captured by the imaging section 27 so that the image is editable.

When the link sticky note button 41d is pressed on the notebook screen 41, the controller 11 of the server device 10 activates the web browser of the terminal device 20 and causes the display section 24 of the terminal device 20 to display a sticky note with the linked uniform resource locator (URL) on the web so that the sticky note is editable.

When the file sticky note button 41e is pressed on the notebook screen 41, the controller 11 of the server device 10 activates the file manipulation app of the terminal device 20 and causes the display section 24 to display an arbitrary file as a sticky note so that the file is editable.

When the dictionary sticky note button 41f is pressed on the notebook screen 41, the controller 11 of the server device 10 activates the dictionary app on the terminal device 20, searches the dictionary database 126 for dictionary headwords and their description information, and causes the display section 24 to display the headwords and description information as sticky notes so that the dictionary is editable.

In the following description, a text sticky note created by pressing the text sticky note button 41b is used as an example. The text sticky note is created by handwritten input, stamp input, or text input.

Figure 6:
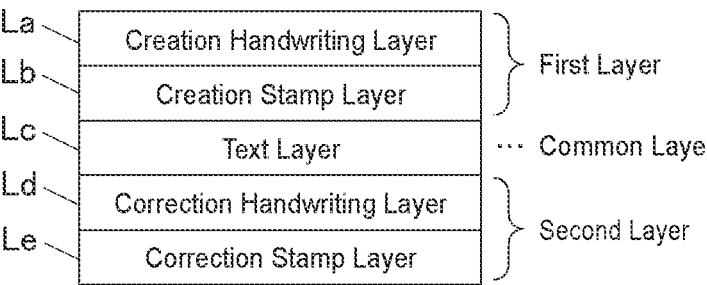
FIG. 6 is a diagram illustrating an example of a layer structure of a sticky note.

FIG. 6 illustrates an example of the layer structure of a sticky note.

Before a sticky note is corrected, the data of the sticky note is composed of a creation handwriting layer La, a creation stamp layer Lb, and a text layer Lc. The creation handwriting layer La and the creation stamp layer Lb correspond to the first layer (creation layer).

When handwritten information is added in the correction, a correction handwriting layer Ld is added to the sticky note data. When a stamp is added in the correction, a correction stamp layer Le is added to the sticky note data. The correction handwriting layer Ld and the correction stamp layer Le correspond to the second layer (correction layer).

In this embodiment, the text layer Lc is a common layer used both for creating or modifying a sticky note and for correcting the sticky note. In other words, data corrected by text input is written in the text layer Lc.

The creation handwriting layer La and the correction handwriting layer Ld correspond to image layers. The creation handwriting layer La (for example, the first image layer) and the correction handwriting layer Ld (for example, the second image layer) have different editing conditions depending on the editing mode. Specifically, the creation handwriting layer La is allowed to be edited when the editing mode is "creation mode." The correction handwriting layer Ld is allowed to be edited when the editing mode is "correction mode."

The creation stamp layer Lb, the correction stamp layer Le, and the text layer Lc correspond to object layers. The creation stamp layer Lb (for example, the first object layer) and the correction stamp layer Le (for example, the second object layer) have different editing conditions depending on the editing mode. Specifically, the creation stamp layer Lb is allowed to be edited when the editing mode is "creation mode." The correction stamp layer Le is allowed to be edited when the editing mode is "correction mode."

Locus data input by hand in the handwriting layer (the creation handwriting layer La, the correction handwriting layer Ld) is converted into an image and stored over a single piece of image data (image area) managed in the handwriting layer. Individual locus data imaged in the handwriting layer cannot be individually deleted, and are deleted as a part of the image data by using an eraser tool or the like. On the other hand, individual stamp data input to the stamp layer (the creation stamp layer Lb, the correction stamp layer Le)

and individual text data input to the text layer (the text layer Lc) are managed as individual object data and are able to be individually deleted.

Figure 7:
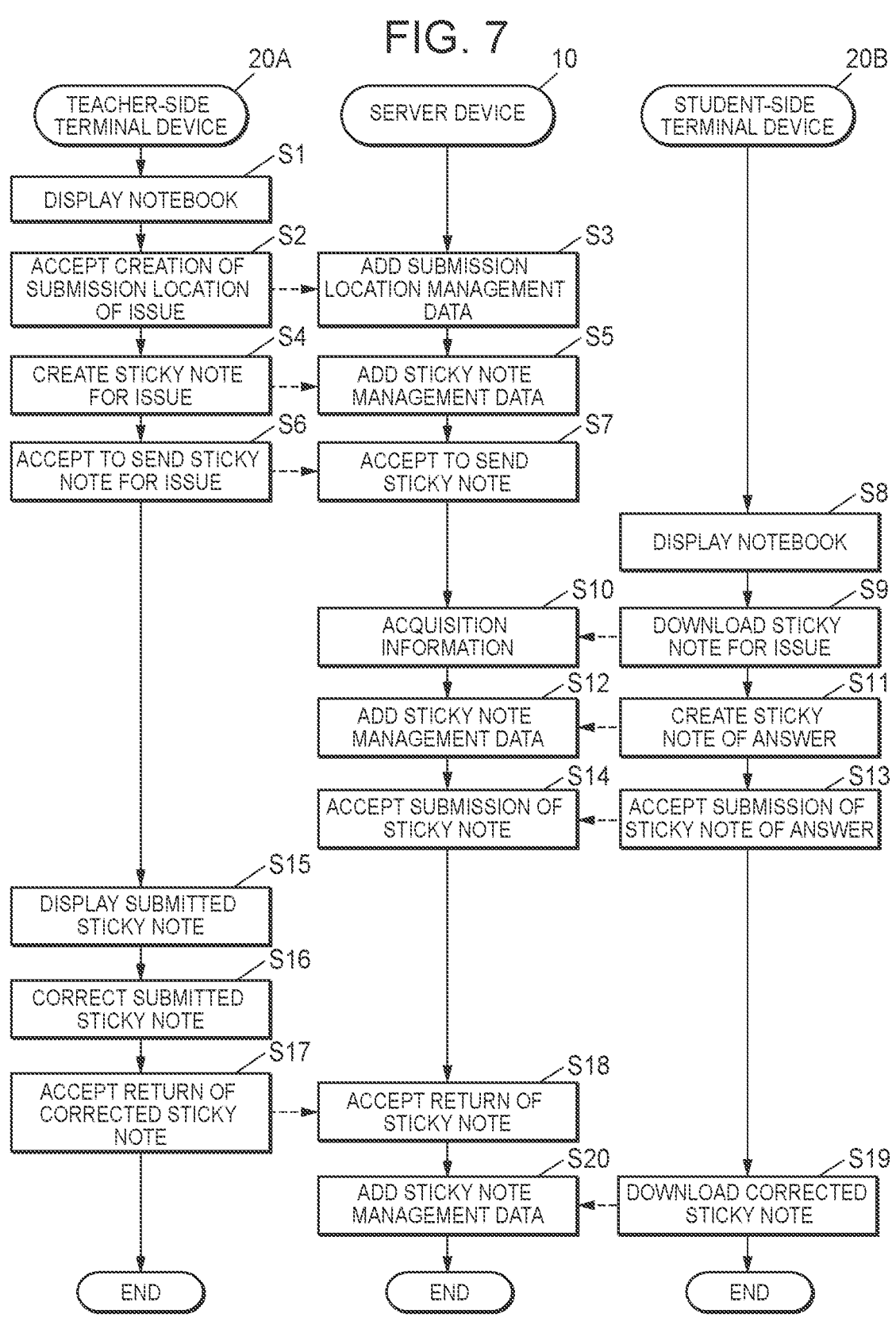
FIG. 7 is a ladder chart illustrating the flow of example use of a lesson support function.

FIG. 7 is a ladder chart illustrating the flow of example use of the lesson support function.

In this specification, a description is given for a flow in which a teacher submits an issue, a student submits an answer to the issue, and the teacher corrects the student's answer. Hereinafter, in the description according to FIG. 7, the terminal device 20 used by the teacher is referred to as "teacher-side terminal device 20A" and the terminal device used by the student is referred to as "student-side terminal device 20B."

The controller 11 of the server device 10 displays the notebook screen 41 (FIG. 4A) on the display section 24 of the teacher-side terminal device 20A used by the teacher (Step S1). Specifically, after the teacher logs in, the teacher selects a target lesson from the lesson list 40a (FIG. 3) on the lesson screen 40 (opens the lesson folder), by which the notebook screen 41 corresponding to the notebook created in the lesson folder opens. The login method and the procedure for opening the notebook screen are the same as those described above.

Subsequently, the controller 11 of the server device 10 accepts the creation of the submission location (submission destination) of the issue on the teacher-side terminal device 20A (step S2). Specifically, when a Submit button 41h (FIG. 4A) in the notebook screen 41 is pressed through the teacher's operation from the operation section 23 in the teacher-side terminal device 20A, the controller 11 of the server device 10 displays an issue management screen 43 illustrated in FIG. 8A on the display section 24 of the teacher-side terminal device 20A.

When a submission destination creation button 43a in the issue management screen 43 is pressed through a teacher's operation from the operation section 23 in the teacher-side terminal device 20A, the controller 11 of the server device 10 displays a submission destination new creation screen (not illustrated) on the display section 24 of the teacher-side terminal device 20A.

The teacher inputs a submission destination name, a deadline (date and time), and the like on the submission destination new creation screen through an operation of the operation section 23 of the teacher-side terminal device 20A.

The controller 11 of the server device 10 associates the submission destination name, the deadline, and the like input by the teacher with the submission location ID and the user ID (issue creator user ID) corresponding to the teacher, and adds them to the submission location management table 125 as submission location management data (step S3).

Subsequently, the controller 11 of the server device 10 accepts the creation of a sticky note for the issue on the teacher-side terminal device 20A (step S4). Specifically, when the text sticky note button 41b is pressed on the notebook screen 41 (FIG. 4A) through a teacher's operation of the operation section 23 of the teacher-side terminal device 20A, the controller 11 displays the sticky note editing screen 42 illustrated in FIG. 5A on the display section 24 of the teacher-side terminal device 20A. Then, the controller 11 accepts the editing of the sticky note content through a teacher's operation of the operation section 23 of the teacher-side terminal device 20A.

When the text input button 42a is pressed on the sticky note editing screen 42, the user (teacher) is enabled to input the content of the sticky note as text in the input area 42d.

Figure 9:
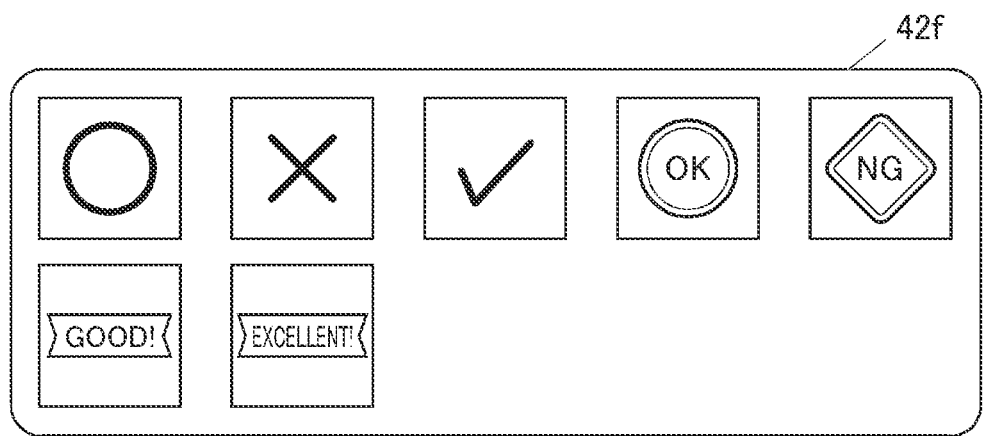
FIG. 9 is an example of a stamp selection panel.

When the stamp input button 42b is pressed on the sticky note editing screen 42, the controller 11 of the server device 10 displays the stamp selection panel 42*f* illustrated in FIG. 9 on sticky note editing screen 42. Each stamp is an image such as a mark or a character string that is prepared in advance, and its position and size within the sticky note may be changed. The user (teacher) is able to select an arbitrary stamp from the stamp selection panel 42*f* and to place the selected stamp in the input area 42*d* of the sticky note editing screen 42.

Figure 10:
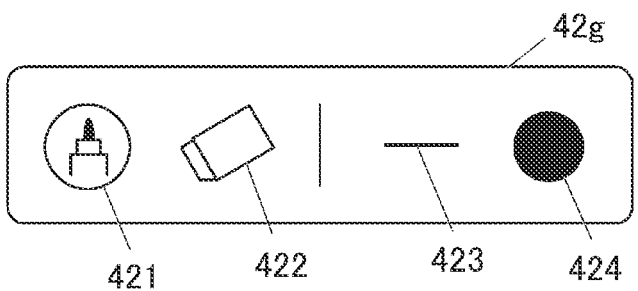
FIG. 10 is an example of a handwriting selection panel.

When the handwriting input button 42*c* is pressed on the sticky note editing screen 42, the controller 11 of the server device 10 displays the handwriting selection panel 42*g* illustrated in FIG. 10 on the sticky note editing screen 42. This enables the user (teacher) to perform handwriting input in the input area 42*d*. The handwriting selection panel 42*g* contains a pen type change button 421, an eraser button 422, a thickness change button 423, and a color change button 424. Pressing the pen type change button 421 enables selection of a pen type from among a normal pen, a marker pen, a straight line, and so on. Pressing the eraser button 422 enables erasing of a line drawn at the position of the pointer that moves according to the operation of the operation section 23 in the input area 42*d*. Pressing the thickness change button 423 enables change of the thickness of the handwritten line. Pressing the color change button 424 enables change of the color of a handwritten line.

When the teacher presses the save button 42*e* on the sticky note editing screen 42 (FIG. 5A) displayed on the display section 24 of the teacher-side terminal device 20A, the controller 11 of the server device 10 stores the data of the sticky note for the issue in the storage section 12 and adds one new row of sticky note management data to the sticky note management table 124 (step S5). Specifically, the controller 11 stores information such as the notebook ID, the sticky note type, and the sticky note content in the sticky note management table 124, in association with the sticky note ID of the created sticky note, and updates the sticky note management table 124.

The controller 11 of the server device 10 displays the sticky note 411 of the created issue in the sticky note display area 41*j* (FIG. 4B) in the notebook screen 41.

Subsequently, the controller 11 of the server device 10 accepts to send the sticky note for the issue in the teacher-side terminal device 20A (step S6). Specifically, when the sticky note 411 is dragged and dropped onto a Send/Receive button 41*i* (FIG. 4B) on the notebook screen 41 by the teacher's operation on the operation section 23, the controller 11 displays a transmission destination specification screen (not illustrated) on the display section 24 of the teacher-side terminal device 20A.

The teacher specifies the transmission destination on the transmission destination specification screen by the operation on the operation section 23 of the teacher-side terminal device 20A. For example, the teacher selects a student as a transmission destination from the transmission destination list or specifies all students in the class as transmission destinations.

When receiving a control signal, based on the teacher's operation of specifying the transmission destination, from the teacher-side terminal device 20A, the controller 11 of the server device 10 accepts to send a sticky note for the issue to the specified transmission destination (Step S7). The controller 11 stores the issue sticky note ID indicating the sticky note for the issue and the distribution destination user ID indicating the specified transmission destination, in association with the submission location ID corresponding to the issue, into the submission location management table 125.

Also for the student-side terminal device 20B used by a student, the controller 11 of the server device 10 displays the notebook screen 41 (FIG. 4A) on the display section 24 (Step S8). Specifically, when the student logs in and then selects a target lesson from the lesson list 40*a* on the lesson screen 40 (opens the lesson folder), the notebook screen 41 corresponding to the notebook created in the folder of the lesson opens. The login method and the procedure for opening the notebook screen are the same as described above.

Subsequently, the controller 11 of the server device 10 accepts download of the sticky note for the issue on the student-side terminal device 20B (step S9). Specifically, when the Send/Receive button 41*i* (FIG. 4A) in the notebook screen 41 is pressed by the student's operation on the operation section 23 in the student-side terminal device 20B, the controller 11 of the server device 10 displays the send/receive history screen 44 illustrated in FIG. 11 on the display section 24 of the student-side terminal device 20B. The send/receive history screen 44 displays the sent/received date and time and information on an unacquired/acquired sticky note for each sticky note sent or received by the student (logged-in user).

When a download button 44*a* corresponding to the sticky note for the issue in the send/receive history screen 44 is pressed by the operation on the operation section 23 in the student-side terminal device 20B, the controller 11 of the server device 10 adds the sticky note 411 for the issue to the sticky note display area 41*j* (FIG. 4B) in the notebook screen 41 and displays the sticky note 411 on the display section 24 of the student-side terminal device 20B.

When the sticky note is downloaded by the student, the controller 11 of the server device 10 acquires acquisition information indicating that the student has already acquired the sticky note (step S10). The controller 11 stores information that the issue has already been acquired, in association with the user ID (distribution destination user ID) of the student who downloaded the sticky note, into the submission location management table 125.

Subsequently, the controller 11 of the server device 10 accepts the creation of the sticky note of the answer to the issue at the student-side terminal device 20B (step S11). The process of step S11 corresponds to a creation stage of the sticky note (the answer to the issue) by the student (the first user). The process of creating the sticky note of the answer is the same as the process of step S4, except that the creation is based on the operation by the student in the student-side terminal device 20B.

Figure 5B:
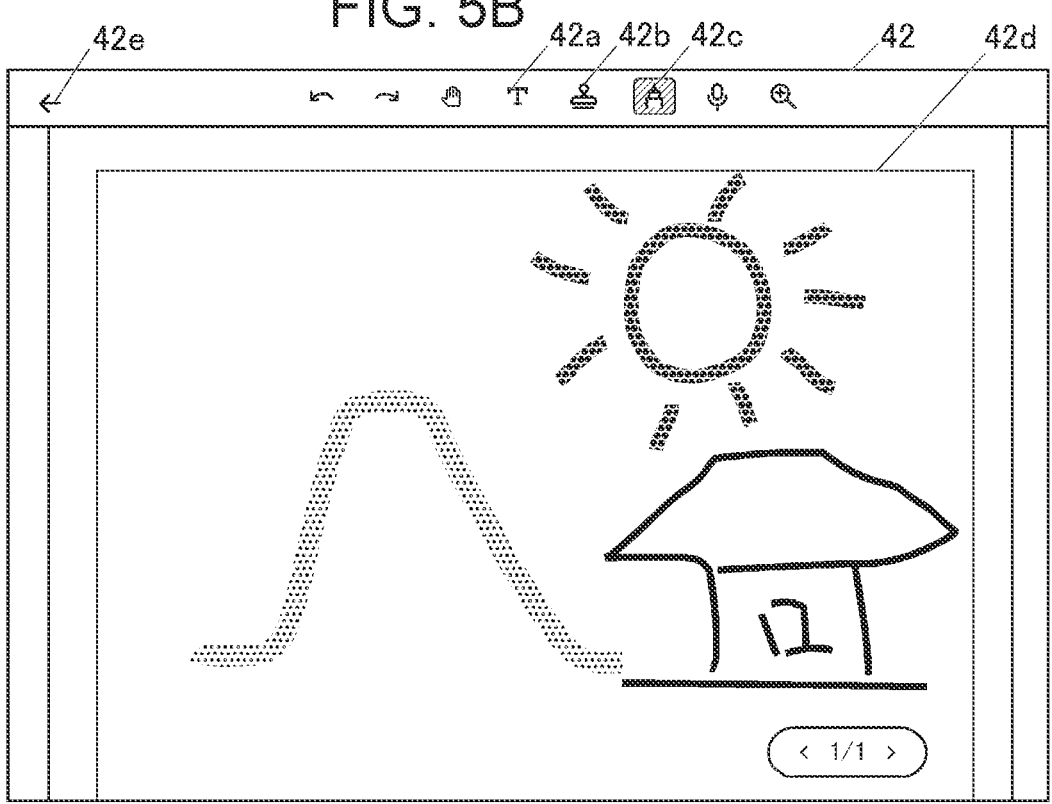
FIG. 5B is an example of the sticky note editing screen under creation.

FIG. 5B illustrates an example of the sticky note editing screen 42 displayed on the display section 24 of the student-side terminal device 20B. The student, for example, writes a handwritten picture on the sticky note editing screen 42 by pressing the handwriting input button 42*c*, which is operated on the operation section 23. In this specification, the edited content based on the student's operation is written into the creation handwriting layer La of the sticky note.

Although an example of an issue in which the student draws a picture (art), the student may write his/her answer by hand in various issues, in such cases where the student is asked to write the process and result of a calculation to solve a problem for a mathematics issue, the student is asked to write an English composition for a language issue, and the like.

When the save button 42*e* is pressed by the student on the sticky note editing screen 42 displayed on the display section 24 of the student-side terminal device 20B, the controller 11 of the server device 10 stores the data of the sticky note of the answer in the storage section 12 and adds one new row of sticky note management data to the sticky note management table 124 (step S12). The sticky note data of the answer is composed of a creation handwriting layer La, a creation stamp layer Lb, and a text layer Lc.

Subsequently, the controller 11 of the server device 10 accepts the submission of the sticky note of the answer at the student-side terminal device 20B (step S13).

The student gives an instruction of submitting a sticky note by dragging and dropping the sticky note 411 (the sticky note of the answer) onto the Submit button 41h by the operation on the operation section 23 on the notebook screen 41 (FIG. 4B) displayed on the display section 24 of the student-side terminal device 20B.

Upon receiving a control signal based on the submission operation by the student from the student-side terminal device 20B, the controller 11 of the server device 10 accepts the submission of the sticky note of the answer to the submission location of the issue (step S14). The controller 11 stores information that the sticky note has already been submitted and the sticky note ID indicating the sticky note of the answer into the submission location management table 125, in association with the user ID (distribution destination user ID) of the student who submitted the sticky note of the answer.

Figures 8A, 8B:
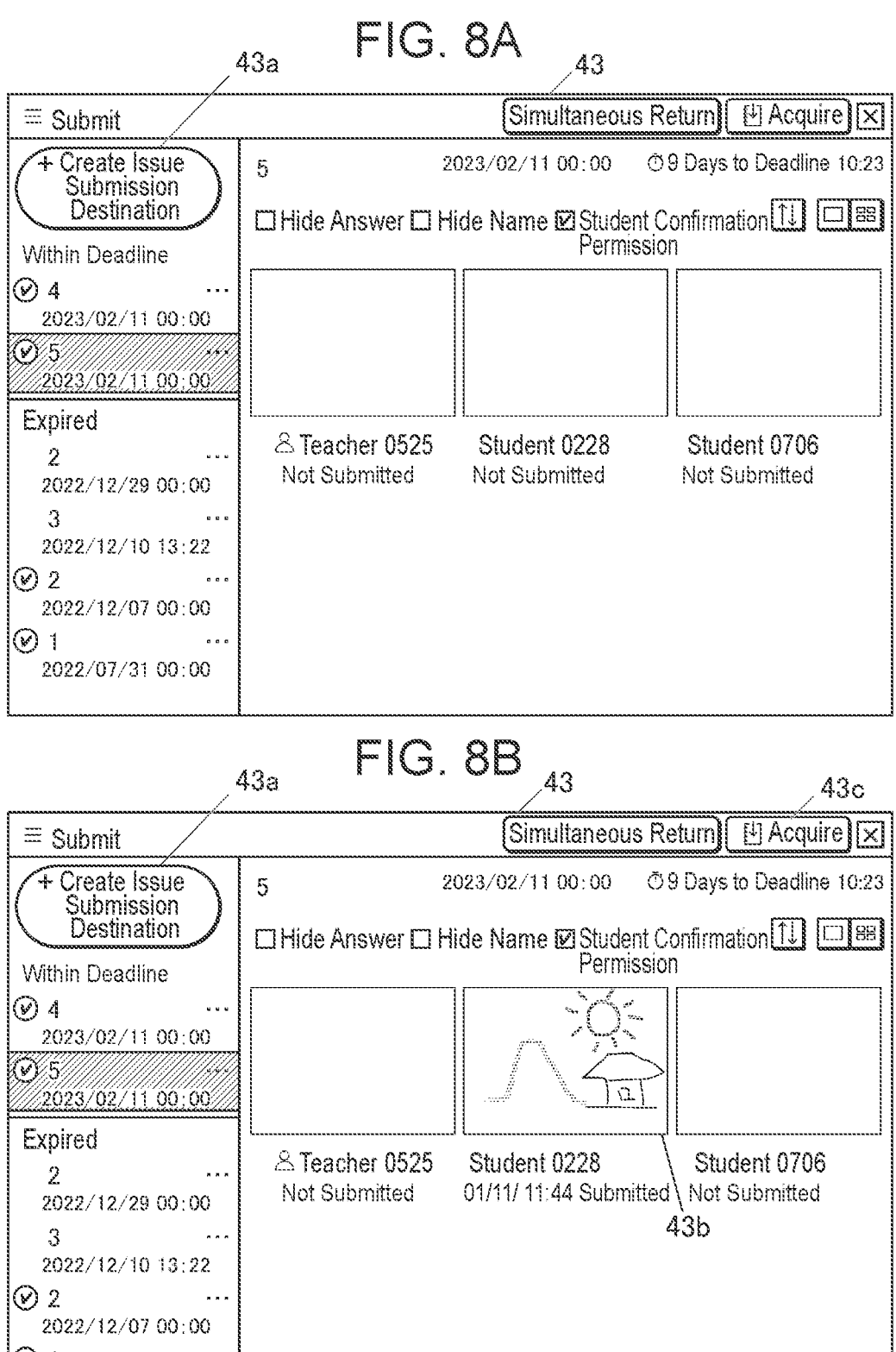
FIG. 8A is an example of an issue management screen.
FIG. 8B is an example of an issue management screen on which a sticky note that has already been submitted is displayed.

The controller 11 of the server device 10 displays the sticky note of the answer submitted by the student on the display section 24 of the teacher-side terminal device 20A (step S15). Specifically, as illustrated in FIG. 8B, the submitted sticky note 43b is displayed on the issue management screen 43 displayed on the display section 24 of the teacher-side terminal device 20A.

Figure 12:
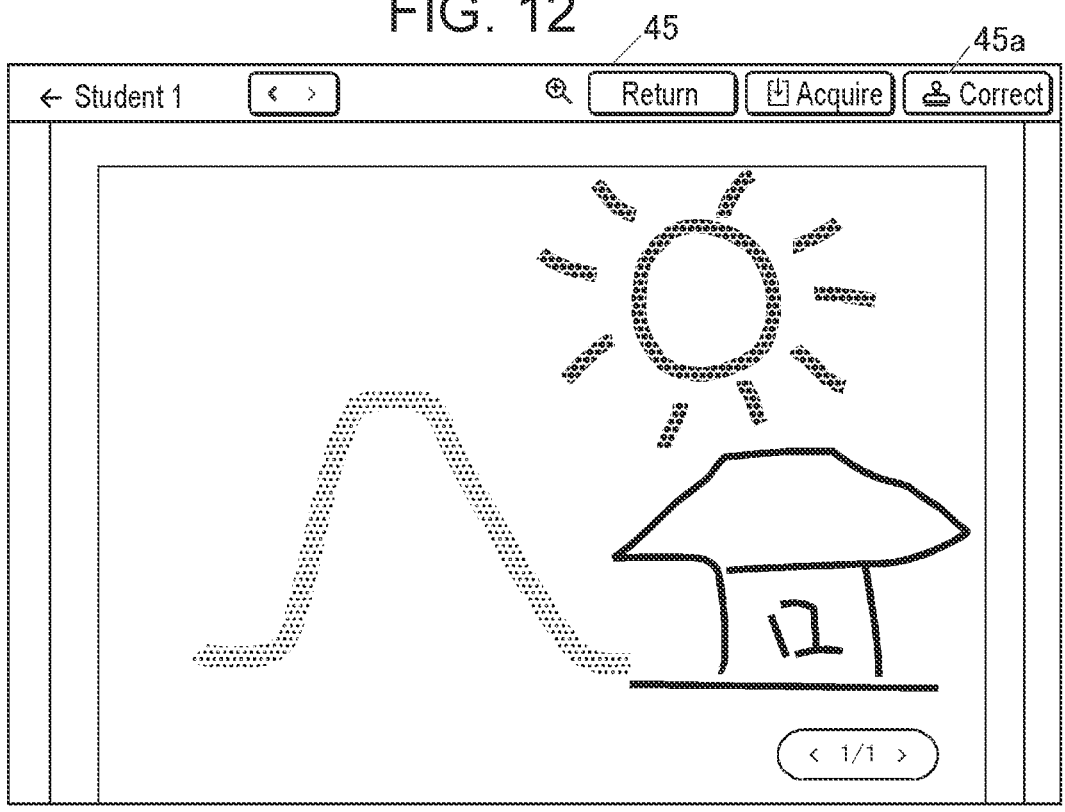
FIG. 12 is an example of a sticky note screen.

When a teacher selects a sticky note to be corrected from among the submitted sticky notes on the issue management screen 43 by the operation on the operation section 23 of the teacher-side terminal device 20A, the controller 11 of the server device 10 displays the sticky note screen 45 of the selected sticky note on the display section 24 of the teacher-side terminal device 20A, as illustrated in FIG. 12.

Figure 13:
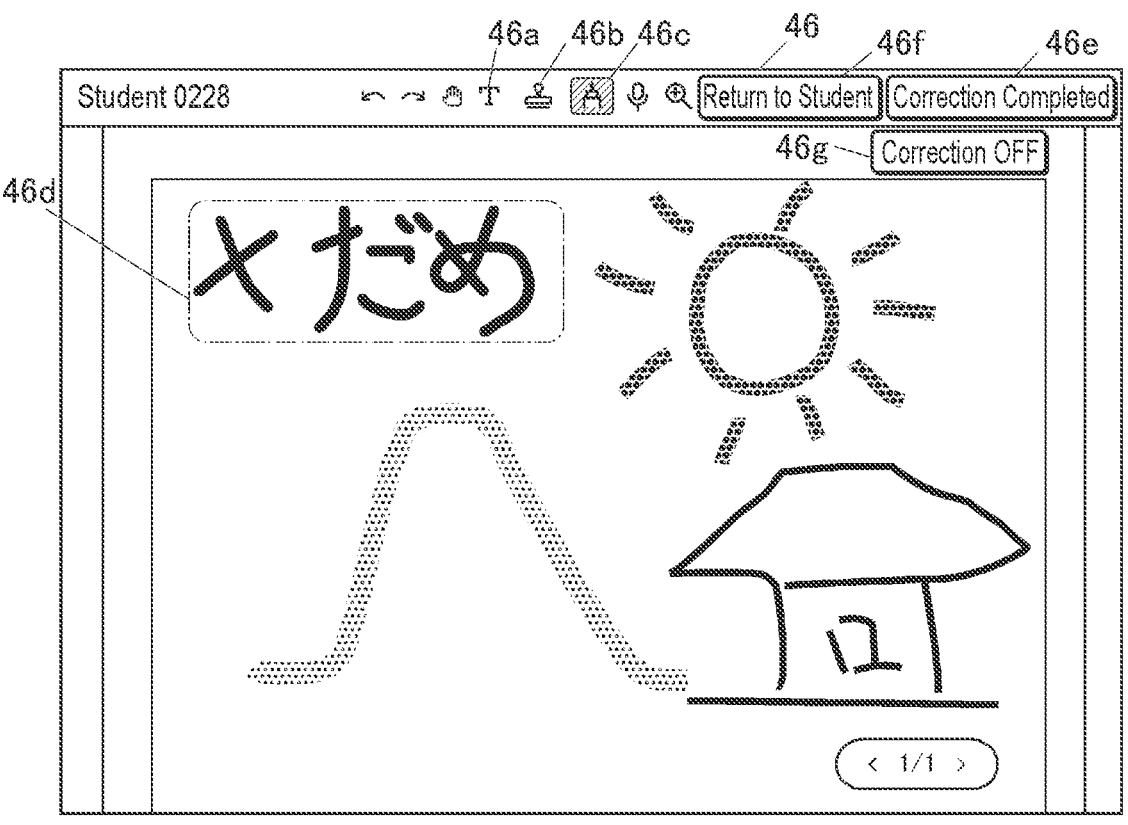
FIG. 13 is an example of a sticky note correction screen.

When the teacher presses the correction button 45a in the sticky note screen 45 by the operation on the operation section 23, the controller 11 of the server device 10 displays the sticky note correction screen 46 for the answer submitted by the student as illustrated in FIG. 13 on the display section 24 of the teacher-side terminal device 20A.

Subsequently, the controller 11 of the server device 10 accepts the correction of the sticky note of the answer submitted by the student at the teacher-side terminal device 20A (step S16). The process of step S16 corresponds to the correction stage of the sticky note (answer) by the teacher (the second user).

The teacher is able to write corrections on the sticky note by pressing a text input button 46a, a stamp input button 46b, or a handwriting input button 46c in the sticky note correction screen 46 by the operation of the operation section 23. The operation methods of the text input button 46a, the stamp input button 46b, and the handwriting input button 46c are the same as those of the text input button 42a, the stamp input button 42b, and the handwriting input button 42c in the sticky note editing screen 42 (FIG. 5A).

In FIG. 13, the correction information 46d, which is written by the teacher by handwriting input, is added. Since this correction information 46d is written into the correction handwriting layer Ld of the sticky note, the correction operation by the teacher does not erase the contents created by the student (contents written into the creation handwriting layer La and the creation stamp layer Lb). On the other hand, the contents written by the teacher (contents written into the correction handwriting layer Ld and the correction stamp layer Le) may be corrected as appropriate.

When the teacher presses the correction completion button 46e on the sticky note correction screen 46 by the operation on the operation section 23 of the teacher-side terminal device 20A, the controller 11 of the server device 10 saves the information added to the sticky note by the correction, into the correction layer (the correction handwriting layer Ld, the correction stamp layer Le). The controller 11 also saves the contents of the text input in the correction into the text layer Lc.

When the teacher presses a return button 46f on the sticky note correction screen 46 by the operation on the operation section 23 of the teacher-side terminal device 20A, the controller 11 of the server device 10 thereby accepts the return of the corrected sticky note to the student (step S17).

Upon receiving a control signal based on the return operation to the student by the teacher from the teacher-side terminal device 20A, the controller 11 of the server device 10 accepts the return of the corrected sticky note (Step S18).

Then, the student downloads the corrected sticky note returned by the teacher on the student-side terminal device 20B (step S19). Specifically, when the Send/Receive button 41i (FIG. 4A) in the notebook screen 41 is pressed by the student through the operation on the operation section 23 of the student-side terminal device 20B, the controller 11 of the server device 10 displays a send/receive history screen (similar to the send/receive history screen 44 illustrated in FIG. 11) on the display section 24 of the student-side terminal device 20B.

When the download button corresponding to the corrected sticky note in the send/receive history screen is pressed in the student-side terminal device 20B, the controller 11 of the server device 10 adds and displays the corrected sticky note 411 to the sticky note display area 41j (FIG. 4B) in the notebook screen 41 on the display section 24 of the teacher-side terminal device 20B.

When the sticky note is downloaded by the student, the controller 11 of the server device 10 adds a new row of sticky note management data to the sticky note management table 124 (step S20).

When the student selects editing of the corrected sticky note downloaded in the student-side terminal device 20B through the operation on the operation section 23, the controller 11 of the server device 10 accepts the modification of the corrected sticky note. This process corresponds to the modification stage of the sticky note (corrected answer) by the student (the first user).

Figure 14:
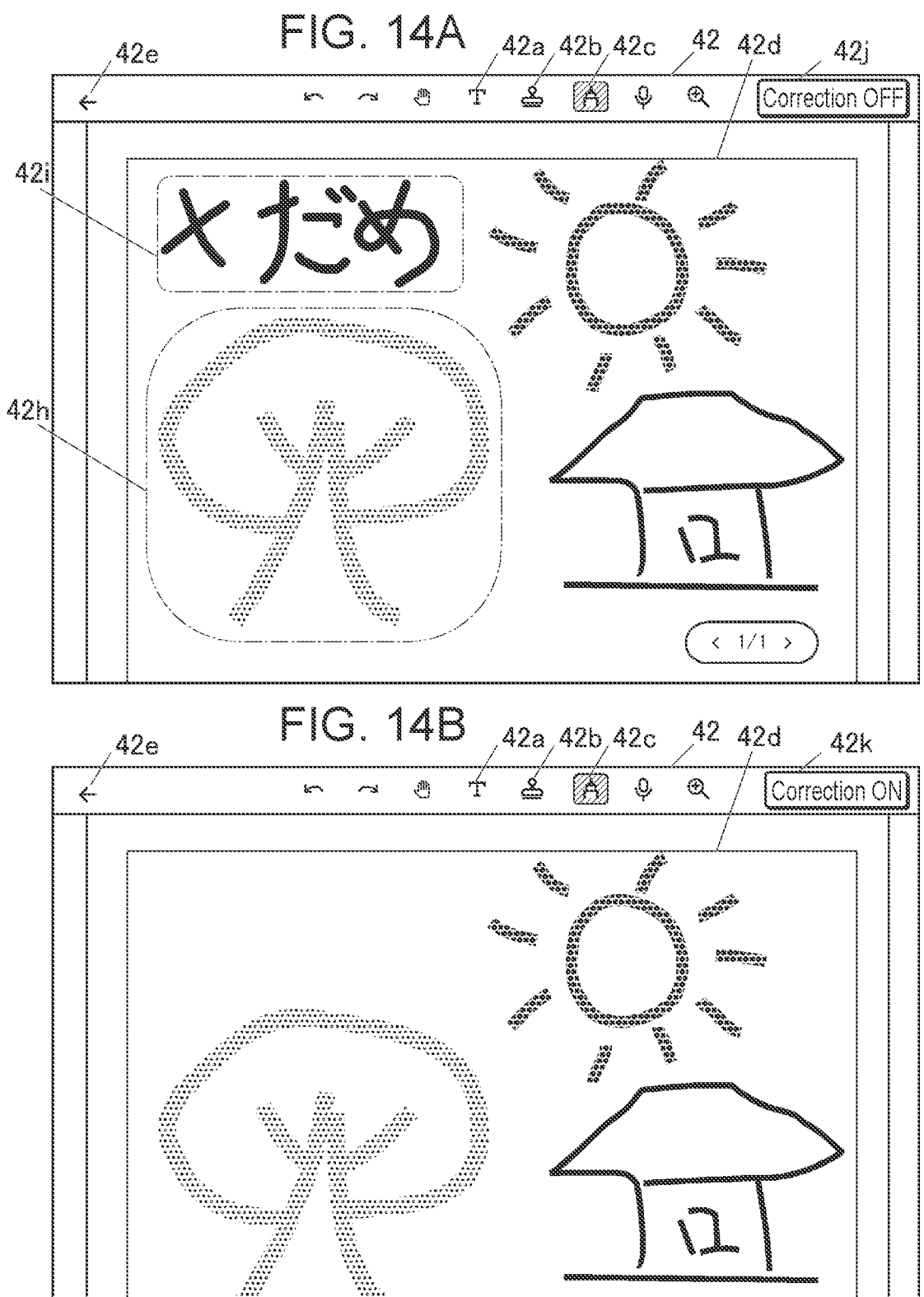
FIG. 14A is an example of a sticky note editing screen for modifying a corrected sticky note.
FIG. 14B is an example of a sticky note editing screen with a hidden correction content.

FIG. 14A illustrates an example of the sticky note editing screen 42 displayed on the display section 24 of the student-side terminal device 20B when the corrected sticky note is modified. In FIG. 14A, compared with FIG. 5B, the content of the sticky note is modified by adding modification information 42h written by the student by handwriting input. Since the modification information 42h is written into the creation handwriting layer La of the sticky note, the modification operation by the student does not erase the correction information 42i (contents written into the correction handwriting layer Ld and the correction stamp layer Le) that the teacher has written by correction. On the other hand, the contents written by the student (contents written into the creation handwriting layer La and the creation stamp layer Lb) may be corrected as appropriate.

As illustrated in FIG. 14A, the sticky note editing screen 42 for the corrected sticky note has a correction OFF button 42j. When the student presses the correction OFF button 42j, the controller 11 of the server device 10 hides the correction information 42*i* (FIG. 14A) on the sticky note editing screen 42, as illustrated in FIG. 14B. This allows the student to confirm the state of the sticky note without the correction content.

The sticky note editing screen 42 illustrated in FIG. 14B has a correction ON button 42*k*. When the student presses the correction ON button 42*k*, the controller 11 of the server device 10 displays the correction information 42*i* on the sticky note editing screen 42 as illustrated in FIG. 14A.

The controller 11 of the server device 10 overwrites the sticky note data of the answer stored in the storage section 12 over the modified contents when the student presses the save button 42*e* on the sticky note editing screen 42 displayed on the display section 24 of the student-side terminal device 20B.

Thereafter, the controller 11 of the server device 10 accepts resubmission of the sticky note of the answer at the student-side terminal device 20B.

On the notebook screen 41 (FIG. 4B) displayed on the display section 24 of the student-side terminal device 20B, the student makes an instruction to resubmit the sticky note by dragging and dropping the sticky note 411 of the modified answer onto the Submit button 41*h* through the operation on the operation section 23.

The details of the process for resubmitting the sticky note of the answer are the same as for the first submission.

Figure 15:
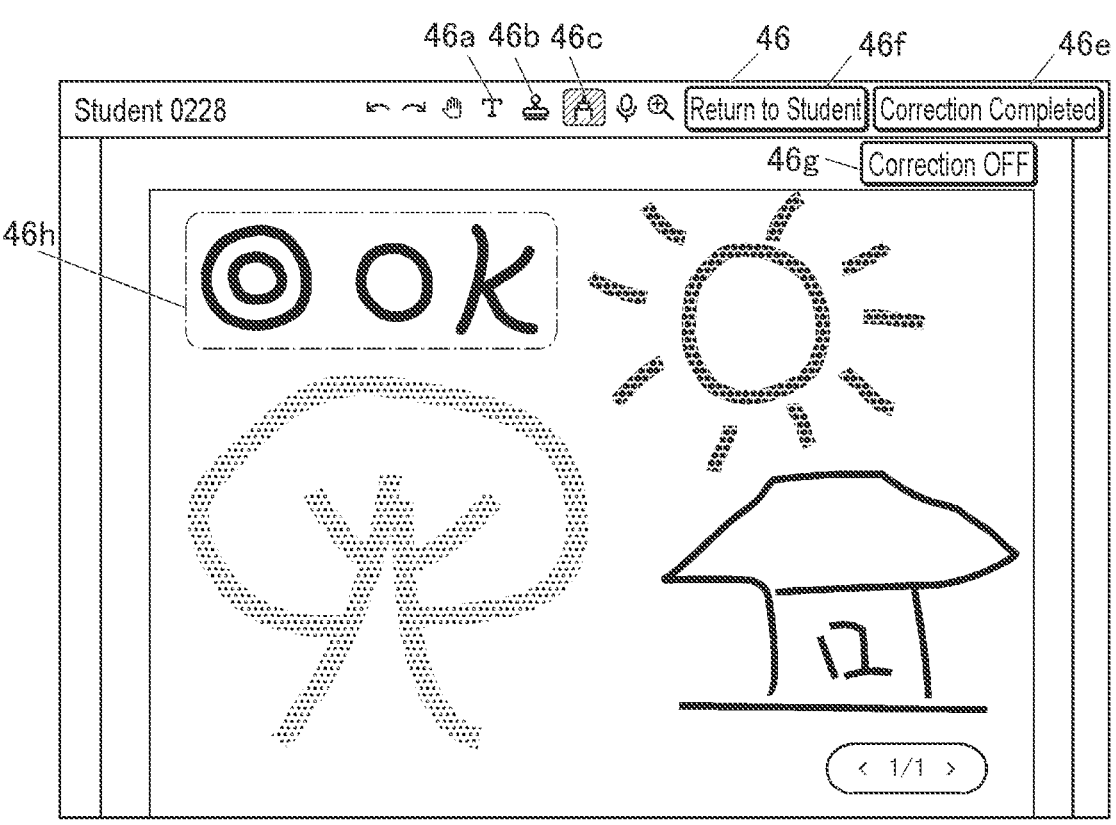
FIG. 15 is an example of a sticky note correction screen for re-correcting a resubmitted answer.

FIG. 15 illustrates an example of the sticky note correction screen 46 for the resubmitted answer, which is displayed on the display section 24 of the teacher-side terminal device 20A.

The controller 11 of the server device 10 accepts the sticky note correction for the answer resubmitted by the student at the teacher-side terminal device 20A. This process corresponds to the re-correction stage of the sticky note (modified answer) by the teacher (the second user).

The teacher writes corrections on the sticky note by pressing the text input button 46*a*, the stamp input button 46*b*, and the handwriting input button 46*c* in the sticky note correction screen 46 through the operation on the operation section 23 of the teacher-side terminal device 20A.

In FIG. 15, in the re-correction, the information is rewritten to the new correction information 46*h*, which was written by the teacher by handwriting input. Since this correction information 46*h* is written into the correction handwriting layer Ld of the sticky note, the correction operation by the teacher does not erase the contents created or modified by the student (contents written in the creation handwriting layer La and the creation stamp layer Lb). On the other hand, the contents written by the teacher (contents written in the correction handwriting layer Ld and the correction stamp layer Le) may be modified as appropriate.

The details of the process of the teacher's re-correction of the resubmitted sticky note and the process of returning the sticky note to the student are the same as those of the first correction.

Hereinafter, the same process is repeated in the cases where the student modifies the sticky note and the teacher corrects the sticky note again.

Figure 16:
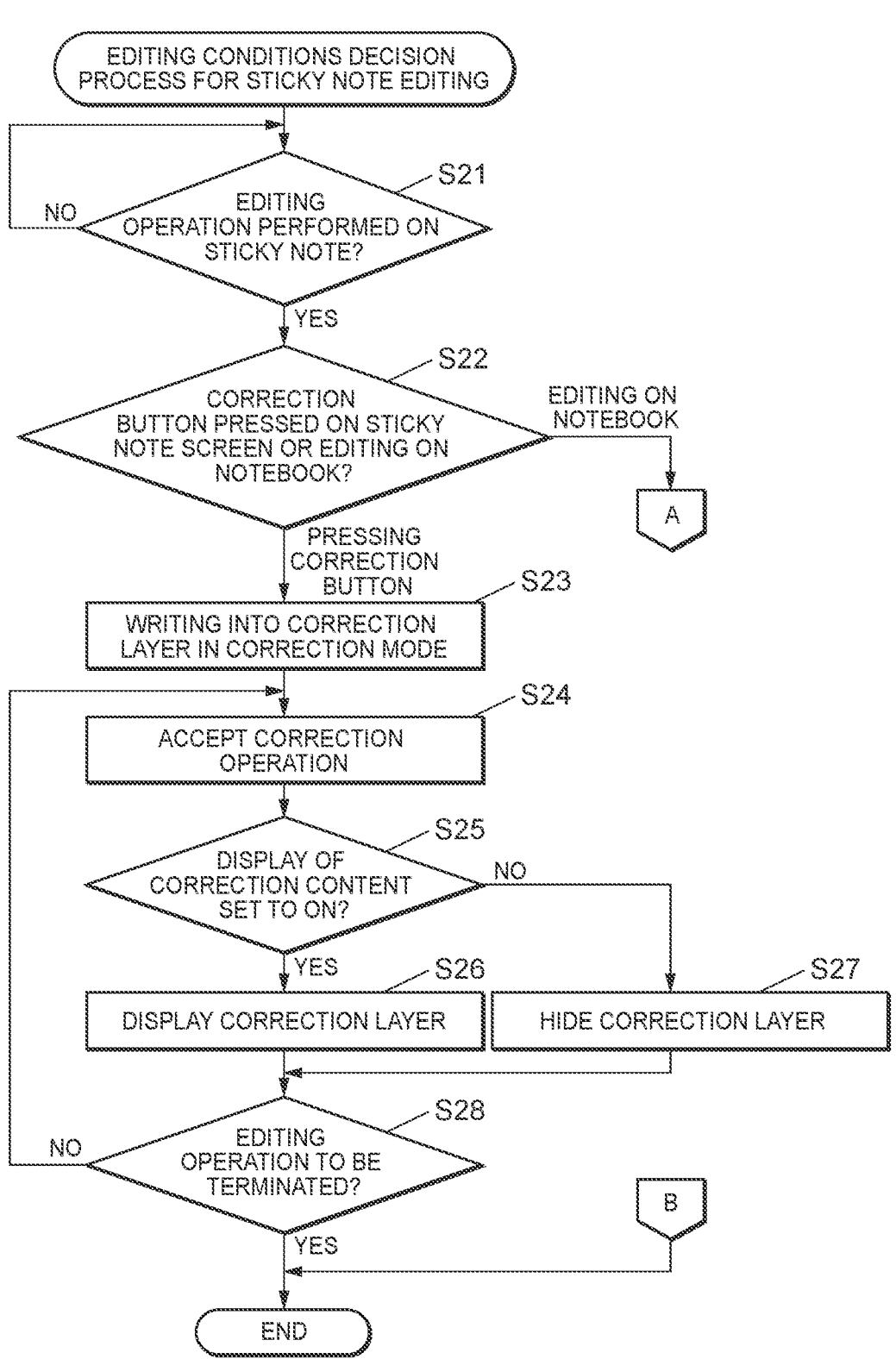
FIG. 16 is a flowchart illustrating an editing conditions decision process for sticky note editing.
Figure 17:
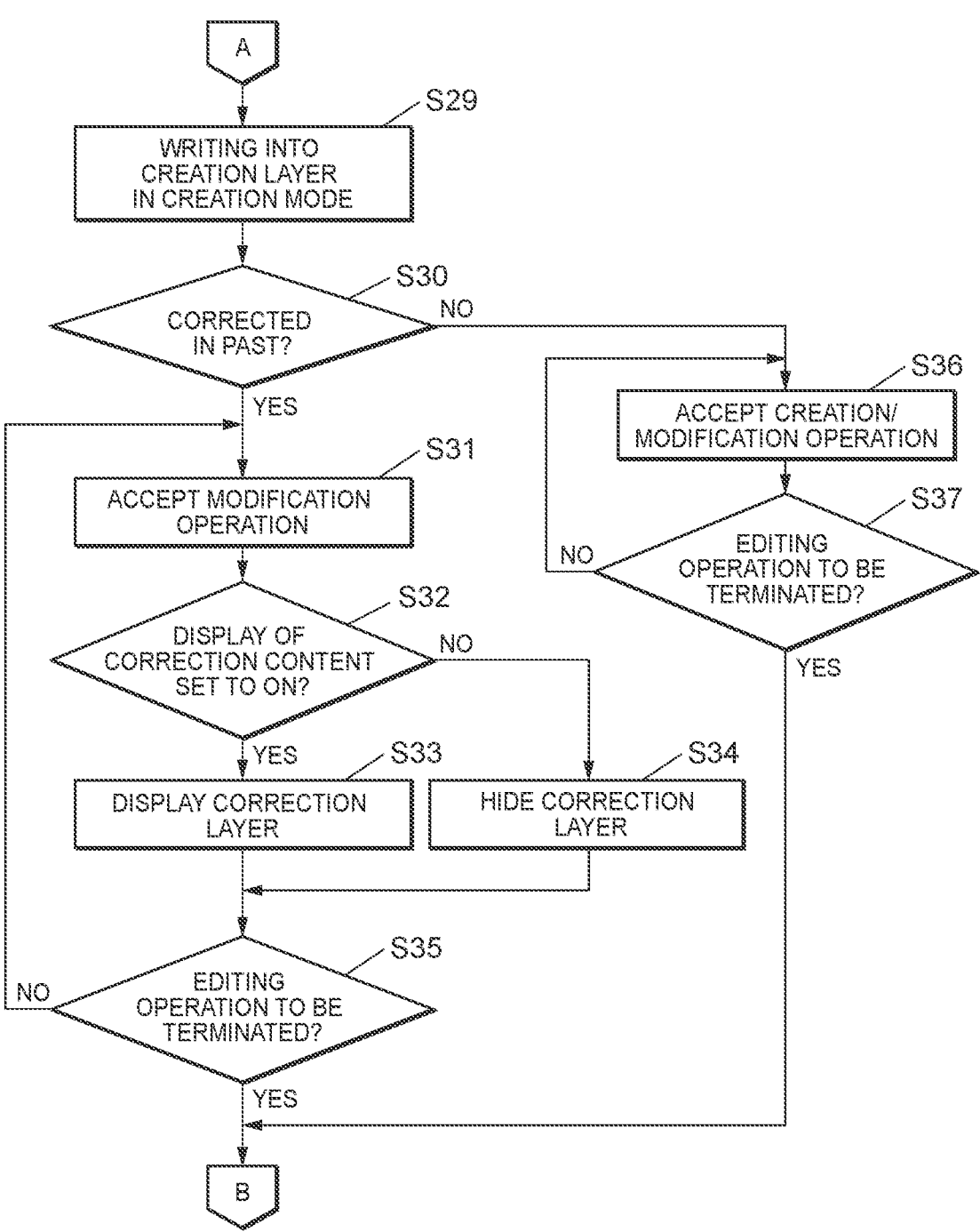
FIG. 17 is a flowchart illustrating an editing conditions decision process for sticky note editing.

FIGS. 16 and 17 are flowcharts illustrating the editing conditions decision process for sticky note editing executed on the server device 10. Note that the user who uses the terminal device 20 may be either a teacher or a student.

The controller 11 of the server device 10 determines whether an editing operation is performed on the sticky note by the user's operation on the operation section 23 of the terminal device 20 (step S21). The editing operation on the sticky note includes creating a new sticky note, correcting a sticky note, and modifying a sticky note.

In the case where no editing operation is performed on the sticky note (step S21; NO), the process returns to step S21.

In the case where an editing operation is performed on the sticky note (step S21; YES), the controller 11 determines whether the editing operation is the pressing operation of the correction button 45*a* on the sticky note screen 45 (FIG. 12) or the editing operation on the notebook (step S22). The editing operation on the notebook means the editing operation on the sticky note selected on the notebook screen 41 (FIG. 4B).

In the case where the editing operation on the sticky note is the pressing operation of the correction button 45*a* on the sticky note screen 45 (step S22; the correction button is pressed), the controller 11 decides to set the editing mode for the sticky note to "correction mode" and to write the edited content based on the operation on the terminal device 20 into the correction layer (the correction handwriting layer Ld, the correction stamp layer Le) of the sticky note (step S23). The text layer Lc is a common layer in the creation mode and the correction mode, and therefore, when inputting a text for the sticky note, a user writes the text into the text layer Lc. In other words, the controller 11 decides the layers that are allowed for editing for the user to be the correction handwriting layer Ld, the correction stamp layer Le, and the text layer Lc.

Then, the controller 11 displays the sticky note correction screen 46 (for example, FIG. 13) on the display section 24 of the terminal device 20, and accepts the correction operation through a user's operation on the operation section 23 of the terminal device 20 (step S24).

Next, the controller 11 determines whether the display of the correction content is set to ON in the sticky note correction screen 46 (step S25). On the sticky note correction screen 46, either the "correction OFF button" or the "correction ON button" is displayed, and both buttons are toggle buttons.

In the case where the display of the correction content is set to ON in the sticky note correction screen 46 (step S25; YES), the controller 11 overlays the correction layer on the creation layer of the sticky note to be edited and displays the layers on the display section 24 of the terminal device 20 (step S26). Specifically, the controller 11 overlays the creation handwriting layer La, the creation stamp layer Lb, the text layer Lc, the correction handwriting layer Ld, and the correction stamp layer Le, and then displays the layers on the display section 24 of the terminal device 20. In this case, as illustrated in FIG. 13, a correction OFF button 46*g* is displayed on the sticky note correction screen 46, so that the display of the correction content is able to be changed to the OFF state.

On the other hand, in the case where the display of the correction content is not set to ON in the sticky note correction screen 46 (step S25; NO), the controller 11 displays only the creation layer of the sticky note to be edited on the display section 24 of the terminal device 20, and hides the correction layer (step S27). Specifically, the controller 11 overlays the creation handwriting layer La, the creation stamp layer Lb, and the text layer Lc and displays the layers on the display section 24 of the terminal device 20. In this case, the correction ON button (not illustrated) is displayed on the sticky note editing screen 42, so that the display of the correction content is able to be changed to the ON state.

After step S26 or step S27, the controller 11 determines whether there is received an instruction to terminate the editing operation (correction operation) for the sticky note at the terminal device 20 by a user's operation on the operation section 23 of the terminal device 20 (step S28). Specifically, the controller 11 determines whether the correction completion button 46e on the sticky note correction screen 46 is pressed.

In the case where there is no instruction to terminate the editing operation for the sticky note (step S28; NO), the process returns to step S24.

In step S22, in the case where the editing operation for the sticky note is an editing operation on the notebook (step S22; editing on the notebook), moving on to FIG. 17, the controller 11 decides to set the editing mode for the sticky note to "creation mode" and to write the edited content based on the operation from the terminal device 20 into the creation layer (the creation handwriting layer La, the creation stamp layer Lb) of the sticky note (step S29). Note that the text layer Lc is a layer common to both the creation mode and the correction mode, and therefore when text is input to a sticky note, the text is written into the text layer Lc. In other words, the controller 11 decides the layers that are allowed for editing for the user to be the creation handwriting layer La, the creation stamp layer Lb, and the text layer Lc.

Next, the controller 11 determines whether the sticky note to be edited has been corrected in the past (step S30). For example, the controller 11 determines that the sticky note to be edited has been corrected in the past in the case where a correction layer (the correction handwriting layer Ld, the correction stamp layer Le) is present in the sticky note to be edited. A flag indicating whether a sticky note has been corrected may also be used to manage whether the sticky note has been corrected in the past.

In the case where the sticky note to be edited has been corrected in the past (step S30; YES), the controller 11 displays the sticky note editing screen 42 (FIG. 14A, FIG. 14B) on the display section 24 of the terminal device 20, and accepts a modification operation through a user's operation on the operation unit 23 of the terminal device 20 (step S31).

Subsequently, the controller 11 determines whether the display of the correction content is set to ON in the sticky note editing screen 42 (step S32).

In the case where the display of the correction content is set to ON in the sticky note editing screen 42 (step S32; YES), the controller 11 overlays the correction layer on the creation layer of the sticky note to be edited and displays the layers on the display section 24 of the terminal device 20 (step S33). Specifically, the controller 11 overlays the creation handwriting layer La, the creation stamp layer Lb, the text layer Lc, the correction handwriting layer Ld, and the correction stamp layer Le, and then displays the layers on the display section 24 of the terminal device 20. In this case, as illustrated in FIG. 14A, the correction OFF button 42j is displayed on the sticky note editing screen 42, so that the display of the correction content is able to be changed to the OFF state.

On the other hand, in the case where the display of the correction content is not set to ON in the sticky note editing screen 42 (step S32; NO), the controller 11 displays only the creation layer of the sticky note to be edited in the display section 24 of the terminal device 20 and hides the correction layer (step S34). Specifically, the controller 11 overlays the creation handwriting layer La, the creation stamp layer Lb, and the text layer Lc and displays the layers on the display section 24 of the terminal device 20. In this case, as illustrated in FIG. 14B, the correction ON button 42k is displayed on the sticky note editing screen 42, so that the display of the correction content is able to be changed to the ON state.

After step S33 or step S34, the controller 11 determines whether there is received an instruction to terminate the editing operation for the sticky note at the terminal device 20 by a user's operation on the operation section 23 of the terminal device 20 (step S35).

In the case where there is received no instruction to terminate the editing operation for the sticky note (step S35; NO), the process returns to step S31.

In the case where the sticky note to be edited has not been corrected in the past in step S30 (step S30; NO), the controller 11 displays the sticky note editing screen 42 (FIG. 5A, FIG. 5B) on the display section 24 of the terminal device 20, and accepts the creation operation or the modification operation for the sticky note through a user's operation on the operation section 23 of the terminal device 20 (step S36).

The controller 11 determines whether there is received an instruction to terminate the editing operation for the sticky note at the terminal device 20 by a user's operation on the operation section 23 of the terminal device 20 (step S37).

In the case where there is received no instruction to terminate the editing operation for the sticky note (step S37; NO), the process returns to step S36.

The editing conditions decision process for the sticky note editing ends in the case where there is received an instruction to terminate the editing operation for the sticky note in step S28 (step S28; YES), in the case where there is received an instruction to terminate the editing operation for the sticky note in step S35 (step S35; YES), or in the case where there is received an instruction to terminate the editing operation for the sticky note in step S37 (step S37; YES).

FIG. 18 illustrates an example of layers to write on at each situation for each user's editing of a sticky note.

In the situation of creating a sticky note for an answer to an issue, the operator is Student 1 (a person who created the sticky note). Creating the sticky note for the answer corresponds to the process of step S11 in FIG. 7.

When a sticky note is to be edited "in creating a sticky note," first, press the text sticky note button 41b on the notebook screen 41 (FIG. 4A) displayed on the display section 24 of the terminal device 20. Then, the sticky note editing screen 42 (FIG. 5A) is displayed on the display section 24 of the terminal device 20.

In this case, the determination in step S22 of FIG. 16 corresponds to "editing on the notebook," and therefore the destinations to write the edited content based on the operation from the terminal device 20 are the creation handwriting layer La, the creation stamp layer Lb, and the text layer Lc.

In the situation of correcting the sticky note for the answer, the operator is Teacher 1 (a person who corrects the sticky note). Correction of the sticky note corresponds to the process of step S16 in FIG. 7.

When a sticky note is to be edited "in correcting a sticky note," the Submit button 41h is pressed on the notebook screen 41 (FIG. 4A, FIG. 4B) displayed on the display section 24 of the terminal device 20, first, by which the issue management screen 43 (FIG. 8B) is displayed. Selecting the sticky note to be corrected on the issue management screen 43 causes the sticky note screen 45 (FIG. 12) to be displayed on the display section 24 of the terminal device 20. Pressing the correction button 45a in the sticky note screen 45 causes the sticky note correction screen 46 (FIG. 13) to be displayed.

In this case, the determination in step S22 of FIG. 16 corresponds to "pressing the correction button," and therefore the destinations to write the edited content based on the operation from the terminal device 20 are the correction handwriting layer Ld, the correction stamp layer Le, and the text layer Lc.

In a situation where a corrected sticky note is acquired from "Submit" and edited on the notebook, Teacher 2 (a second person who corrects the sticky note) and Student 2 (a person who got the sticky note) may be operators, in addition to Teacher 1 (a person who corrects the sticky note) and Student 1 (a person who created the sticky note).

Teacher 2 is other than the teacher who made the first correction.

Student 2 is a student who got a corrected sticky note. "Getting a sticky note" means that a sticky note created by another user is made available to the user through the sticky note keeping function, sending/receiving function, share function, and so on.

When editing a corrected sticky note on the notebook after acquiring the sticky note from "Submit," the Submit button 41*h* is pressed, first, on the notebook screen 41 (FIG. 4A, FIG. 4B) displayed on the display section 24 of the terminal device 20, by which the issue management screen 43 (FIG. 8B) is displayed. Selecting the corrected sticky note and then pressing an acquisition button 43*c* on the issue management screen 43 causes the selected sticky note to be added onto the notebook screen 41. Giving an instruction to edit the sticky note on the notebook screen 41 causes the sticky note editing screen 42 (for example, FIG. 14A) to be displayed.

In this case, the determination made in step S22 of FIG. 16 corresponds to "editing on the notebook," and therefore the destinations to write the edited content based on the operation from the terminal device 20 are the creation handwriting layer La, the creation stamp layer Lb, and the text layer Lc.

In a situation where a sticky note that has been resubmitted is re-corrected, the operator is Teacher 1 (a person who corrects the sticky note) or Teacher 2 (a second person who corrects the sticky note).

The process "in re-correcting the sticky note" is basically the same as the process "in correcting a sticky note."

In the case of "in re-correcting the sticky note," the determination in step S22 of FIG. 16 corresponds to the "pressing the correction button," and therefore the destinations to write the edited content based on the operation from the terminal device 20 are the correction handwriting layer Ld, the correction stamp layer Le, and the text layer Lc.

In a situation where a corrected sticky note is acquired from "Keep" and edited in a notebook, Teacher 1 (a person who corrects the sticky note), Teacher 2 (a second person who corrects the sticky note), Student 1 (a person who created the sticky note), and Student 2 (a person who got the sticky note) may be operators.

First, the keeping function of the sticky note is described below.

In the notebook screen 41 (FIG. 4B) displayed on the display section 24 of the terminal device 20, the user drags and drops the sticky note 411 onto the Keep button 41*g* through an operation of the operation section 23 to make an instruction to keep the sticky note. As a destination for keeping the sticky note, one of the following folders may be selected: my folder, a school shared folder, and a teacher shared folder.

My folder is a folder dedicated for the user himself/herself, and only the user himself/herself is allowed to upload to and download from the folder.

The school shared folder is a shared folder for all teachers and all students who belong to the same school, and all teachers are allowed to upload to and download from the shared folder, while students are allowed only to download from the shared folder.

The teacher shared folder is a shared folder for all teachers who belong to the same school, and all teachers are allowed to upload to and download from the folder, but the teacher shared folder is not displayed to students.

Figure 19:
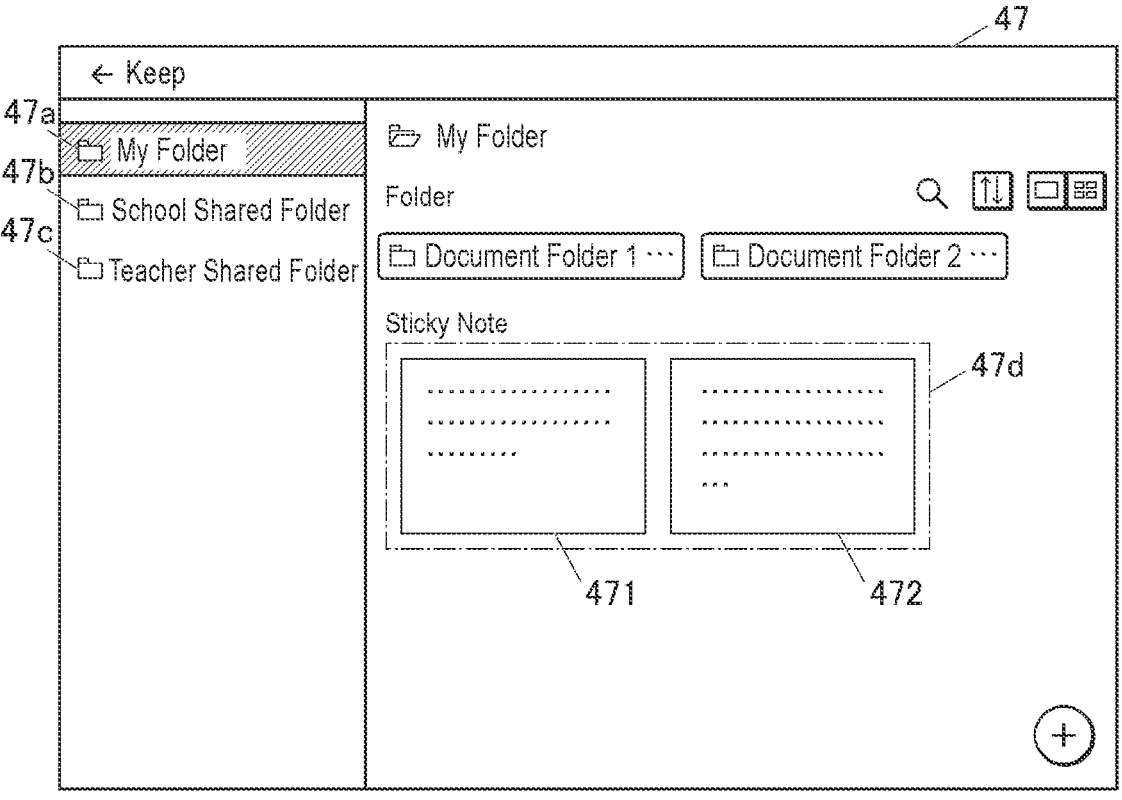
FIG. 19 is an example of a sticky note keeping screen.

When acquiring a corrected sticky note from "Keep" and editing the corrected sticky note in the notebook, the Keep button 41*g* is pressed, first, on the notebook screen 41 (FIG. 4A, FIG. 4B) displayed on the display section 24 of the terminal device 20, by which the sticky note keeping screen 47 illustrated in FIG. 19 is displayed.

On the sticky note keeping screen 47, my folder 47*a* and the school shared folder 47*b* are displayed. The teacher shared folder 47*c* is displayed only when the user is a teacher.

Moreover, in the sticky note display area 47*d* of the sticky note keeping screen 47*d*, sticky notes kept in the selected folder are displayed. In FIG. 19, sticky notes 471 and 472 kept in my folder 47*a* are displayed in the sticky note display area 47*d*.

Upon selecting a corrected sticky note in the sticky note display area 47*d* of the sticky note keeping screen 47, the selected sticky note is added onto the notebook screen 41. When an instruction is given to edit the sticky note on the notebook screen 41, the sticky note editing screen 42 (for example, FIG. 14A) is displayed.

In this case, the determination in step S22 of FIG. 16 corresponds to "editing on the notebook," and therefore the destinations to write the edited content based on the operation from the terminal device 20 are the creation handwriting layer La, the creation stamp layer Lb, and the text layer Lc.

In a situation where a corrected sticky note is acquired from "Send/Receive" and edited on the notebook, Teacher 1 (a person who corrects the sticky note), Teacher 2 (a second person who corrects the sticky note), Student 1 (a person who created the sticky note), and Student 2 (a person who got the sticky note) may be operators.

First, description of the sending/receiving function of a sticky note is added.

The sending/receiving function is not limited to distributing the sticky note of an issue, but also includes allowing a user to send a sticky note to an arbitrary user by specifying a destination where the sticky note is sent, so that the user on the receiving end is able to download the sticky note.

When the source user drags and drops the sticky note 411 onto the Send/Receive button 41*i* on the notebook screen 41 (FIG. 4B) displayed on the display section 24 of the terminal device 20, through an operation of the operation section 23, then a transmission destination specification screen (not illustrated) is displayed on the display section 24 of the terminal device 20.

When the source user specifies the transmission destination user on the transmission destination specification screen through an operation of the operation section 23 of the terminal device 20 and gives an instruction to send the sticky note, the controller 11 of the server device 10 accepts to send the sticky note to the specified transmission destination user.

Figure 11:
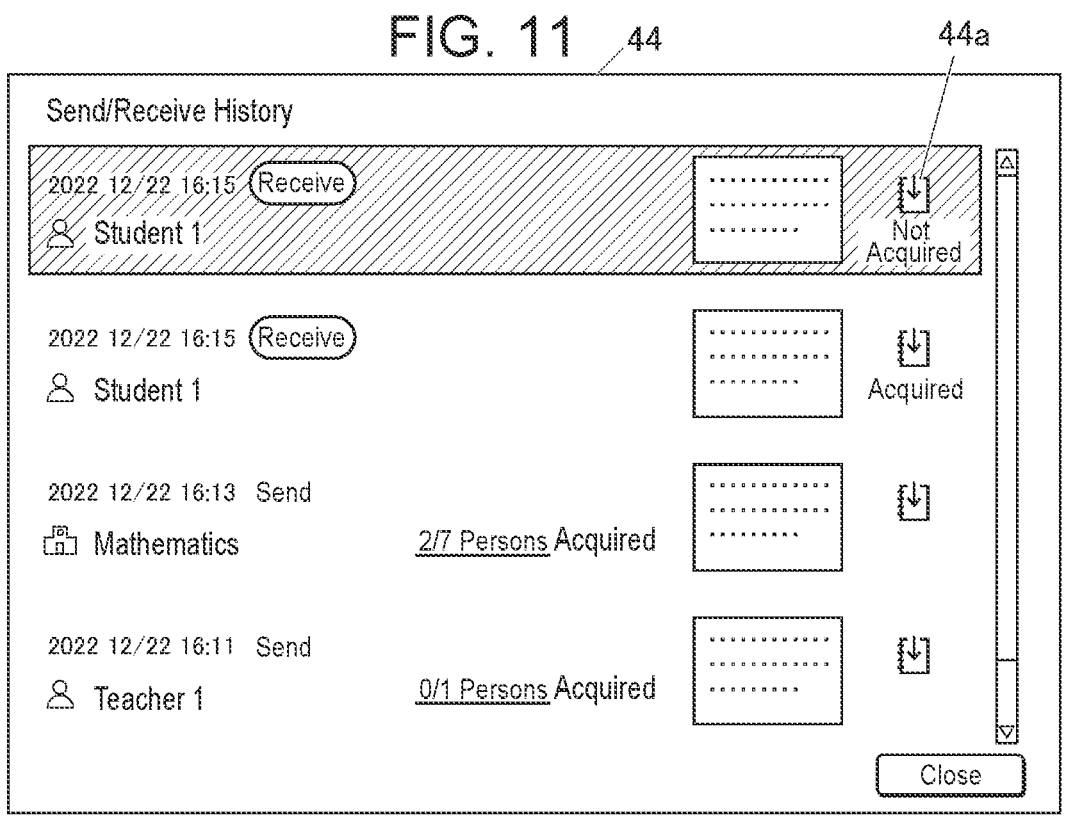
FIG. 11 is an example of a send/receive history screen.

When acquiring a corrected sticky note from "Send/Receive" and editing the sticky note on the notebook, the Send/Receive button 41*i* is pressed, first, on the notebook screen 41 (FIG. 4A, FIG. 4B) displayed on the display section 24 of the terminal device 20 of the user who received the sticky note, by which a send/receive history screen (similar to the send/receive history screen 44 illustrated in FIG. 11) is displayed. Pressing the download button corresponding to the corrected sticky note on the send/receive history screen adds the selected sticky note onto the notebook screen 41. When an instruction is given to edit the sticky note on the notebook screen 41, the sticky note editing screen 42 (for example, FIG. 14A) is displayed.

In this case, the determination made in step S22 of FIG. 16 corresponds to "editing on the notebook," and therefore the destinations to write the edited content based on the operation from the terminal device 20 are the creation handwriting layer La, the creation stamp layer Lb, and the text layer Lc.

In the situation where the corrected sticky note is acquired from "Share" and edited on the notebook, Teacher 1 (a person who corrects the sticky note), Teacher 2 (a second person who corrects the sticky note), Student 1 (a person who created the sticky note), and Student 2 (a person who got the sticky note) may be operators.

First, the share function of a sticky note is described.

The user who is a publisher gives an instruction to publish the notebook on the notebook screen 41 (FIG. 4B) displayed on the display section 24 of the terminal device 20 through the operation on the operation section 23. Then, the notebook at that time for publication is saved and a URL for publication to other users is issued. The user who is a publisher communicates the URL to the users to whom the notebook is to be published by some means (for example, by sending e-mails or the like).

When the user at the publication destination (the recipient) specifies the URL corresponding to the published notebook through an operation on the operation section 23 in the terminal device 20, the display section 24 of the terminal device 20 displays the notebook screen 41 (FIG. 4B) containing the sticky note. In this way, the users at the publication destinations are enabled to acquire the corrected sticky note from "Share," by which the users are able to share the sticky note.

In the share function, the procedure for publishing a notebook of one user to other users in the share function is not limited to the above example.

When editing a corrected sticky note acquired from "Share" on the notebook, an instruction is made to edit the sticky note (corrected sticky note) on the notebook screen 41 displayed on the display section 24 of the terminal device 20, by which a sticky note editing screen 42 (for example, FIG. 14A) is displayed.

In this case, the determination in step S22 of FIG. 16 corresponds to "editing on the notebook," and therefore the destinations to write the edited content based on the operation from the terminal device 20 are the creation handwriting layer La, the creation stamp layer Lb, and the text layer Lc.

Although description has been made mainly on the case where the editing mode is selected according to the approach method used when a sticky note is to be edited in the editing conditions decision process for sticky note editing (see FIG. 16 and FIG. 17), various methods may be used to select an editing mode according to which of the plurality of editing stages the sticky note is in when editing the sticky note step by step.

For example, the controller 11 of the server device 10 selects "creation mode" as the editing mode when a user with the attribute "student" is in the editing stage (creation stage) to create a new sticky note for an answer to an issue. Then, the controller 11 allows editing of the sticky note on the creation handwriting layer La, the creation stamp layer Lb, and the text layer Lc as editing conditions according to the "creation mode."

The controller 11 selects "correction mode" as the editing mode when a user with the attribute "teacher" is in the editing stage (correction stage) to correct the sticky note for an answer. For example, the controller 11 may determine that the current stage is the first correction stage on the basis of the absence of the correction handwriting layer Ld and the correction stamp layer Le in the sticky note data and a fact that the user attribute is "teacher." Then, the controller 11 allows editing on the correction handwriting layer Ld, the correction stamp layer Le, and the text layer Lc as the editing conditions according to the "correction mode."

The controller 11 selects "creation mode" as the editing mode when a user with the attribute "student" is in the editing stage (modification stage) to modify a corrected sticky note. For example, the controller 11 may determine that the current stage is the modification stage for the corrected sticky note on the basis of the presence of the correction handwriting layer Ld and the correction stamp layer Le in the sticky note data and a fact that the user attribute is "student." Then, the controller 11 allows editing of a sticky note on the creation handwriting layer La, the creation stamp layer Lb, and the text layer Lc as the editing conditions according to the "creation mode."

The controller 11 selects "correction mode" as the editing mode when a user with the attribute "teacher" is in the editing stage (re-correction stage) to re-correct a sticky note that has already been modified. For example, the controller 11 may determine that the current stage is the re-correction stage on the basis of the presence of the correction handwriting layer Ld and the correction stamp layer Le in the sticky note data and a fact that the user attribute is "teacher." Then, the controller 11 allows editing of the correction handwriting layer Ld, the correction stamp layer Le, and the text layer Lc as the editing conditions according to the "correction mode."

As described above, according to the server device 10 (information processing device) in this embodiment, the controller 11 selects the editing mode (the creation mode, the correction mode) according to the approach method used when a sticky note is to be edited through an operation of the terminal device 20, and decides the editing conditions of the sticky note for the user according to the selected editing mode, thereby avoiding unintended editing of the sticky note (target data). For example, when a user is to correct a sticky note, the editing is distinguished from normal editing by limiting the range of allowed editing, thereby avoiding unintended parts from being erased.

In other words, according to the server device 10, the user-machine interaction process is able to reliably support the user in performing technical tasks (performing edits without erasing unintended parts).

In addition, depending on the attribute of the user and the type of editing, there may be a plurality of approach methods that differ in the procedure or operation content when moving to the editing screen to edit a sticky note. For example, the editing screen to which the screen is able to be moved through an operation may be varied, or the type of allowed editing and the selection candidates for the procedure or operation content may be varied, depending on whether the user is a teacher or a student.

Moreover, the controller 11 of the server device 10 selects the editing mode according to which editing stage the editing operation of the sticky note from the terminal device 20 is in among the plurality of editing stages and decides the editing conditions of the sticky note according to the selected editing mode, thereby avoiding unintentional editing of a sticky note (target data).

For example, the editing mode is able to be selected according to which of the following editing stages the editing operation on the sticky note is in: the creation stage by a student, the correction stage by a teacher, the modification stage by a student, and the re-correction stage by a teacher.

In addition, the sticky note (target data) is managed in a plurality of layers with different edited contents. The controller 11 of the server device 10 decides the editing conditions of the sticky note by deciding the layers that are allowed to be edited among the plurality of layers according to the selected editing mode.

This makes it possible to prohibit editing on other layers by separating the writing destinations for the sticky note managed in the plurality of layers. For example, when a user is to correct a sticky note, the editing is distinguished from normal editing to cause writing onto the correction layer, thereby avoiding unintentional editing.

Moreover, the sticky note (target data) is managed by dividing the layers into the first layer (creation layer) used for creation or modification and the second layer (correction layer) used for correction of the sticky note, thereby avoiding editing on other layers by dividing the writing destinations. By using the first layer for creating or modifying a sticky note and the second layer for correcting the sticky note, the sticky note is able to be repeatedly corrected or modified without changing the contents of other layers. For example, the controller 11 of the server device 10 automatically decides the layers to write on through an operation of the terminal device 20 according to the approach method (how to enter the screen to edit the sticky note) when the sticky note is to be edited. Therefore, the user does not need to consciously specify the layer on which the edited content is written.

Note that the data of a sticky note is not doubly retained for creation and correction, and therefore the amount of data is not doubled compared to the conventional system.

In addition, the layers are simply divided according to usage, and therefore the number of required layers does not increase even in the case of an increase in the number of users who edit the sticky note.

Moreover, the controller 11 of the server device 10 decides the second layer as the destination of writing by editing a sticky note when an instruction is made to correct the sticky note through an operation of the terminal device 20, thereby enabling prohibition of editing on the first layer when the user is trying to correct the sticky note. This prevents, for example, the teacher from accidentally erasing the original data (content created by the student) that is the subject of correction when correcting.

Moreover, the controller 11 of the server device 10 decides the first layer as the writing destination by editing on the sticky note when an instruction is given to perform editing other than correction (normal editing) on the sticky note through an operation of the terminal device 20, thus prohibiting editing on the second layer when the user is to perform editing other than correction. This prevents, for example, the student from accidentally erasing the correction content added by the teacher to the sticky note when the student modifies the sticky note.

The controller 11 of the server device 10 is able to switch between a state in which the first and second layers overlap each other and a state in which only the first layer is displayed, as desired, by switching the display or non-display of the second layer (correction content) on the display unit 24 through an operation of the terminal device 20. This also allows the user to confirm the state in which the correction content is not displayed.

In addition, a student who creates a sticky note (target data) and a teacher who corrects the sticky note (target data) use the lesson support function provided by the server device 10, thereby avoiding unintended editing when an answer to an issue or the like is used as target data.

Moreover, the layer structure in the sticky note data is maintained even through the keeping function, the sending/receiving function, and so on. Therefore, when a user other than the student who created the sticky note and the teacher who first corrected the sticky note handles the sticky note, the first layer (creation layer) is used to modify the sticky note, and the second layer (correction layer) is used to correct the sticky note.

Furthermore, the controller 11 of the server device 10 is able to avoid unintentional editing by deciding whether to allow editing of image layers that are managed as a single piece of image data that has been imaged, according to the selected editing mode.

For example, the editing conditions may be changed for the first image layer (for example, the creation handwriting layer La) and the second image layer (for example, the correction handwriting layer Ld), according to the user attribute (teacher, student, or the like) and the editing stage (the creation stage, the correction stage, the modification stage, or the like).

The controller 11 of the server device 10 is also able to avoid unintentional editing of object layers by deciding whether to allow editing according to the selected editing mode.

For example, the editing conditions may be changed for the first object layer (for example, the creation stamp layer Lb) and the second object layer (for example, the correction stamp layer Le), according to the user attribute (teacher, student, or the like) and the editing stage (the creation stage, the correction stage, the modification stage, or the like).

In addition, the controller 11 of the server device 10 is able to generate layers (the correction handwriting layer Ld, the correction stamp layer Le) corresponding to a specific editing mode, as needed. Moreover, the controller 11 is able to determine whether an editing operation is performed in the specific editing mode by the presence or absence of the layer corresponding to the specific editing mode.

The descriptions of the above embodiments are examples of the information processing device, the information processing system, the information processing method, and the recording medium related to the present disclosure, and are not limited thereto. The detailed configuration and operation of respective parts constituting the device may be changed as appropriate to the extent not to depart from the purpose of the present disclosure.

For example, the various methods described above may be combined as appropriate for selecting the editing mode for a sticky note (target data).

Also the types of editing mode and the way of dividing editing stages are not limited to the above examples.

In the above embodiments, in the layer structure of the sticky note illustrated in FIG. 6, the text layer Lc is described as a common layer used for both creating or modifying a sticky note and correcting the sticky note. A creation text layer, however, used for creating or modifying a sticky note may be provided separately from a correction text layer used for correcting the sticky note.

What is claimed is:

1. An information processing device for creating and editing target data in sequential stages, the information processing device comprising:

a controller configured to:

decide an editing condition of the target data by deciding which of a plurality of layers of the target data is allowed to be edited according to an editing mode, wherein deciding the editing condition comprises:

in response to receiving, via a network from a server device, first input from a first user, enter a first creation stage in a creation mode, as the editing mode, and create, as the editing condition decided, a first layer of the plurality of layers of the target data, the first layer including content corresponding to the first input from the first user;

in response to receiving, via the network from the server device, first input from a second user and in the absence of a second layer in the target data, enter a first correction stage in a correction mode, as the editing mode, and edit, as the editing condition decided, the target data to include a second layer of the plurality of layers, the second layer including content corresponding to the first input from the second user; and in response to receiving, via the network from the server device, second input from the first user and in the presence of the second layer in the target data, enter a modification stage in the creation mode, as the editing mode, and modify, as the editing condition decided, the first layer of the target data based on content corresponding to the second input from the first user.

2. The information processing device according to claim 1, wherein the controller is further configured to:

in response to receiving a second input from the second user and in the presence of modification of the first layer of the target data, enter a re-correction stage in the correction mode and modify the second layer of the target data based on content corresponding to the second input from the second user.

3. The information processing device according to claim 1, wherein:

the first user is a student and the second user is a teacher;

the target data is data in which a student's answer to an issue given by the teacher is input; and the first creation stage of the target data includes the student's answer to the issue, the first correction stage of the target data includes the teacher's correction to the student's answer, and the modification stage of the target data includes a student's modification to the teacher's correction.

4. The information processing device according to claim 1, wherein each of the first layer and the second layer includes:

an image layer in which a plurality of input data is managed as a single piece of image data and new input data in an imaged state is overlaid on the single piece of image data so that the new input data is stored in a form where the new input data is not able to be individually deleted; and an object layer in which the plurality of input data is managed as individual object data and the new input data is stored in a form where the new input data is able to be individually deleted.

5. The information processing device according to claim 4, wherein the controller is configured to decide whether to allow editing for both the image layer and the object layer, depending on the one of the creation mode and correction mode entered.

6. The information processing device according to claim 4, wherein the image layer includes a first image layer and a second image layer with different editing conditions according to the one of the creation mode and correction mode entered.

7. The information processing device according to claim 4, wherein the object layer includes a first object layer and a second object layer with different editing conditions according to the one of the creation mode and correction mode entered.

8. The information processing device according to claim 4, wherein:

the image layer is a layer where handwritten data is input; and the object layer is a layer where stamp data or text data is input.

9. The information processing device according to claim 1, wherein the second layer is not present before entry into the first correction stage and is created in response to entry into the first correction stage.

10. The information processing device according to claim 1, wherein the first input is other than instruction to correct the target data.

11. The information processing device according to claim 1, wherein the controller is configured to:

control a display to display the first layer and the second layer overlaid each other; and switch between display and non-display of the second layer through a user operation.

12. The information processing device according to claim 1, wherein the controller is configured to enter one of the creation mode and the correction mode according to an approach method used when the target data is to be edited by each of the first user and the second user through an operation of a terminal device corresponding to the first user and the second user.

13. The information processing device according to claim 12, wherein:

the approach method includes a plurality of approach methods in which the procedure or the operation content used when moving to an editing screen for editing the target data differs according to a user attribute and an editing type; and the controller is configured to enter the one of the creation mode and the correction mode according to the difference in the approach method.

14. The information processing device according to claim 1, wherein the target data is data shared by the first user and the second user as an electronic sticky note.

15. An information processing method for creating and editing target data in sequential stages, the information processing method comprising:

deciding an editing condition of the target data by deciding which of a plurality of layers of the target data is allowed to be edited according to an editing mode;

in response to receiving first input from a first user, via a network from a server device, entering a first creation stage in a creation mode, as the editing mode, and creating, as the editing condition decided, a first layer of the plurality layers of the target data, the first layer including content corresponding to the first input from the first user;

in response to receiving, via the network from the server device, first input from a second user and in the absence of a second layer in the target data, entering a first correction stage in a correction mode, as the editing mode, and editing, as the editing condition decided, the target data to include a second layer of the plurality of layers, the second layer including content corresponding to the first input from the second user; and in response to receiving, via the network from the server device, second input from the first user and in the presence of the second layer in the target data, entering a modification stage in the creation mode, as the editing mode, and modifying, as the editing condition decided, the first layer of the target data based on content corresponding to the second input from the first user.

16. A non-transitory computer-readable recording medium storing a program that causes a computer of an information processing device for creating and editing target data in sequential stages, to:

decide an editing condition of the target data by deciding which of a plurality of layers of the target data is allowed to be edited according to an editing mode, wherein deciding the editing condition comprises:

in response to receiving first input from a first user, enter a first creation stage in a creation mode, as the editing mode, and create, as the editing condition decided, a first layer of the plurality of layers of the target data, the first layer including content corresponding to the first input from the first user;

in response to receiving first input from a second user and in the absence of a second layer in the target data, enter a first correction stage in a correction mode, as the editing mode, and edit, as the editing condition decided, the target data to include a second layer of the plurality of layers, the second layer including content corresponding to the first input from the second user; and in response to receiving second input from the first user and in the presence of the second layer in the target data, enter a modification stage in the creation mode, as the editing mode, and modify, as the editing condition decided, the first layer of the target data based on content corresponding to the second input from the first user.

* * * * *